United States Patent [19]
Hogen et al.

[11] Patent Number: 5,620,893
[45] Date of Patent: Apr. 15, 1997

[54] MICROBIAL MEDIATED METHOD FOR SOIL AND WATER TREATMENT

[75] Inventors: Delman R. Hogen, 7813 Madison St., Spring Lake Park, Minn. 55432; James R. Robin, Excelsior, Minn.

[73] Assignee: Delman R. Hogen, Spring Lake Park, Minn.

[21] Appl. No.: 362,509

[22] PCT Filed: Jul. 8, 1993

[86] PCT No.: PCT/US93/06455

§ 371 Date: Feb. 15, 1995

§ 102(e) Date: Feb. 15, 1995

[87] PCT Pub. No.: WO94/02421

PCT Pub. Date: Feb. 3, 1994

[51] Int. Cl.[6] .................... B09B 3/00; B09C 1/10
[52] U.S. Cl. ........................ 435/262; 435/262.5
[58] Field of Search ..................... 435/262, 262.5

[56] References Cited

U.S. PATENT DOCUMENTS

| | | |
|---|---|---|
| 3,388,060 | 6/1968 | Clark et al. . |
| 3,423,309 | 1/1969 | Albertson . |
| 3,480,144 | 11/1969 | Barth et al. . |
| 3,522,173 | 7/1970 | Lindman et al. . |
| 3,617,569 | 11/1971 | Daniels . |
| 3,655,552 | 4/1972 | Flock, Jr. et al. . |
| 3,730,882 | 5/1973 | Levin et al. . |
| 4,108,771 | 8/1978 | Weiss . |
| 4,209,575 | 6/1980 | Bykowski et al. . |
| 4,220,527 | 9/1980 | Udaka et al. ............... 435/262 |
| 4,267,058 | 5/1981 | Kyri et al. . |
| 4,476,027 | 10/1984 | Fox . |
| 4,507,206 | 3/1985 | Hughes . |
| 4,566,975 | 1/1986 | Allgulin . |
| 4,695,384 | 9/1987 | Ripl et al. . |
| 4,717,558 | 1/1988 | Beck et al. . |
| 5,089,412 | 2/1992 | Hackl et al. ............... 435/262 |
| 5,354,688 | 10/1994 | Francis et al. ............ 435/262.5 |

*Primary Examiner*—Helen Pratt
*Attorney, Agent, or Firm*—Vidas, Arrett & Steinkraus

[57] ABSTRACT

Methods for treating aqueous/sedimentary systems, sediments and soils are disclosed for prevention of activation and for control or clean-up. The method involves intentionally adding to an aqueous system containing unwanted sulfur and phosphorus in the water and hydrocarbons in the sediment, iron species selected from the group consisting of elemental iron, iron carbonates and iron oxides. Iron-phosphorus compounds and iron-sulfur compounds are precipitated and thereby removed from the system. Hydrocarbons are convened into water, carbon dioxide and small amounts of methane. In a practice of this invention, propagation of aquatic vegetation dependent upon phosphorus species and sulfur species is inhibited by the removal of these species therefrom. Heavy metals are inactivated.

38 Claims, 5 Drawing Sheets

MICROBIAL MEDIATED METHOD FOR SOIL AND WATER TREATMENT

BACKGROUND OF THE INVENTION

The changing of the quality of water in lakes and rivers from clear and pristine to murky, green and foul smelling is a natural process called eutrophication. Unfortunately, man's activities have speeded up this process to such an astonishing rate that the changes which would naturally take thousands of years are now noticeable in a matter of a few years and even months. These trophic changes are triggered by the introduction of large quantities of nutrients such as phosphorus and sulfur into the aquatic environments which radically alters the ratio of these elements with the natural systems that have kept them in check.

As nutrients, phosphorus and sulfur promote the growth of a large group of aquatic organisms such as algae as well as many of the higher plants. The threshold level of these nutrients which can trigger this rapid growth appears to be very low, 30 parts per billion (ppb) or less. Oligotrophic, or clear, clean lakes have nutrient values below these levels, whereas, hyper-eutrophic ponds and lakes can have values above 350 ppb. and are characterized by algae, plant growth and, in many cases, the rotten egg smell of hydrogen sulfide.

The use of algicides and aquatic herbicides to control rampant plant populations in lakes is at best an expensive band-aid which must be repeated, several times per year in many cases. Other nutrient controls, such as alum, are extremely expensive, technically demanding and have long term side effects. Unfortunately, it is not merely enough to stop the introduction of new nutrient loads into these environments since the existing nutrients are continually recycled as plants die and decay.

In addition to the changes in trophic state the impact of toxic heavy metals from a variety of sources has left many aquatic environments hazardous to all living systems.

This invention in one aspect relates to methods for controlling sulfur phosphorus and heavy metals in aqueous/sedimentary systems by aquatic nutrient binding and precipitation. Phosphorus as phosphate and sulfur as sulfide are removed by iron binding and precipitation. Heavy metals are removed by replacement reactions in aqueous carbonaceous systems which supress the heavy metal solubility and migration, thus restricting the heavy metal bioavailability. More particularly, in this aspect, the present invention involves methods for controlling excessive epilimnetic bioavailability of sulfur ions and phosphorus ions in aquatic/sedimentary environments such as lakes, ponds and waste treatment systems. Such ions are considered to be "nutrients" in aqueous environments with respect to vegetation, algae and the like. It also controls heavy metals including Hg, Pb, Cu, Ni, Zn, Cr and Mn by direct replacement and precipitation of these less active metals. While particularly focusing upon aquatic environments, the methods of this invention in this aspect are likely to be useful in essentially any aqueous/sedimentary system where control, usually reduction, of the concentration of phosphorus or sulfur ions, among other things, in all of their various oxidation states is desired.

Excessive quantities of sulfur and phosphorus compounds are becoming more prevalent in the environment. These elements are byproducts of many activities which enhance quality of life. Many biological processes also generate these ions, in free or combined form. Excessive concentrations of these elements in the free or combined states in aquatic systems tend to create problems including the aforementioned aquatic eutrophication, objectionable odors and environmental toxins.

Elemental sulfur (that is, sulfur with an oxidation state of zero, $S^0$) can exist in both oxygenated (aerobic) and deoxygenated (anaerobic) aqueous or aquatic environments. Elemental sulfur also can be activated by oxidation (e.g., in aerobic environments) to sulfate ($SO_4^{-2}$) ions; and by reduction to sulfide ions ($S^{-2}$). Sulfur in all oxidation states can be utilized to form organic sulfur compounds. Organic sulfur compounds are important in protein formation and many other biochemical processes. As the microbes, plants, and animals die and decay or as the waste byproducts of these organisms decay, sulfide ions ($S^{-2}$) and bisulfide ions ($HS^{-1}$) are released into the environment.

Anaerobically, sulfide binds to a number of metals to create sulfides in aquatic environment sediments and at the water/sediment interface. Metal sulfides have a very limited solubility in water. That is, they have very small solubility constants or solubility products in water. Thus, metals which have become bound to sulfide and bisulfide ions are removed from the aquatic environment or aqueous systems by precipitation. Iron (II) $Fe^{+2}$ is the most prevalent cation, in the list of decreasing ionic activity which forms a tightly bound sulfide compound. The heavy metal sulfides have much lower solubility products than iron and so are depleated from the water column in the presence of excess ionized iron. As the aquatic system moves to a stable condition in the sediments, the solubilized sulfide ion will move to the condition of least activity. The most common cationic residence of sulfide is as iron sulfide (ferrous sulfide) which has a solubility constant of 1×10–17 moles per liter.

In most of the trophic states, phosphorus, as phosphate ($PO_4$ and $PO_3$), is the limiting element for biological productivity. Phosphate ion is precipitated by a number of metal ions but is later released from sediment by the exchange of sulfide ion with the phosphate ion and causing a reprecipitation. The sulfide is then retained on the metal and the phosphate is released to the water column as an available biological nutrient. In natural oligotrophic lakes, the sulfur, phosphorus, and iron, in the sediments, are in a balance which prevents the release of either sulfur or phosphorus to the free water as ionic nutrients. These aquatic biological systems are operating on limited nutrient budget. In this manner, they maintain clear water and thinly populated vegetation beds.

There are many aquatic systems where there is a large excess of free sulfide ion at the sediment interface and in the anoxic hypolimnetic waters. Without iron to precipitate this sulfide the subsequently released phosphate will migrate to the aerobic bioactive regions. This rate can be determined by its productivity level, its subsequent annual detritus deposition rate, and the bioavailability of the deposited nutrients. Detritus is the combined residual accumulation of microbial, plant, and animal materials. There are four recognized trophic states or bands: oligotrophic, mesotrophic, eutrophic, and hypereutrophic. The oligotrophic state is characterized by extremely low biological productivity and a very small bioavailable nutrient pool. "Mesotrophic" describes an actively recycling aquatic system but growth limited by general nutrient availability. "Eutrophic" describes a continuous biologically productive aquatic system which is utilizing a large nutrient pool to the exclusion of one or more nutrients. "Hypereutrophic" describes an out-of-control biological system in which productivity is limited by environmental conditions and has an available nutrient pool which cannot be fully utilized.

As phosphorus and sulfur are added to an aquatic environment, this desirable balance of a lake can be upset. The iron content of the incoming water does not keep pace with the increasing levels of phosphorus and sulfur because, unlike phosphorus and sulfur, iron is not a significant natural waste byproduct of modern lifestyles or common biological processes.

As the sulfur and phosphorus concentrations in the sediments become greater than the quantity of iron available to retain them, these elements are cycled or released into the upper aquatic environment. The result is increased growth of aquatic plants, epiphytic algae, and planktonic algae. Sulfur and phosphorus then become available for accelerated and unrestrained biological activity which further hastens the eutrophication process. Once the release has begun, the resulting microbial activity further enhances the release process.

Inorganic and organic sulfur compounds are readily reduced to sulfides by microbial and other environmental processes in anoxic environments. These sulfides are toxic to many biological organisms even in very small concentrations. In higher concentrations, sulfides can prevent seed germination in, for example, wild rice, and probably many other native plants. Free sulfide ions are chemically able to replace the phosphate ion on a ferrous iron molecule and thus reintroduce phosphate into an aquatic environment from the bottom sediments. The ability to control the sulfide and selectively control the soluble reactive phosphorus in an aquatic environment becomes a very useful tool for the management of the water environments mentioned above. That in one aspect, is what the subject invention is about and it makes use of ferrous iron ($Fe^{+2}$) and ferric iron ($Fe^{+3}$) for this purpose in combination with microbe(s) mediation.

In another aspect and in addition to the above uses, this invention provides a method for oxidizing organics to deplete the carbon pool which may include hydrocarbons and pesticides, from the sediment of aqueous systems and from the soil generally. As such, the method may be used not only to reduce the sediment depth in lakes ponds and the like by removing organics but may be used to remove unwanted hydrocarbons and the like from soil as well.

Current efforts at managing objectionable levels of nutrient concentrations in all types of aquatic environments involve the use of everything from cosmetic coverup to nutrient inactivation schemes involving various phosphorus precipitating agents. Some of these approaches are as follows:

1. Harvesting of aquatic vegetation is used as a means of controlling aquatics such as Eurasian milfoil and other large aquatic plants on recreational lakes. The harvesters are extremely expensive to buy and operate, leave a residue of aquatic vegetation which is free to populate new areas, and require handling and disposing of large volumes of vegetation which has a very low concentration of the target nutrients. A thousand pounds of vegetation contains one pound of phosphorus and a much smaller amount of sulfur.

2. Utilization of herbicides falls under the category of cosmetic treatments. This approach has a very short term positive effect and potential long term negative effects. Aside from the potential damage to non-target systems, there is the buildup of decaying algae and or vegetation as detritus which later becomes a nutrient source for subsequent growth.

3. Copper sulfate treatment for algae is yet another technique which is also largely cosmetic. This technique has the drawback of putting copper, a required micronutrient for the growth of undesirable blue-green algae, into a system where it was not readily available prior to the treatment.

4. Diatomaceous earth is used as a nonspecific flocculent for algae. It has a high cost and is restricted to binding positively charged molecules. The result is a lowered total alkalinity and hence a reduced capacity for the aquatic system to remove the unwanted sulfur and phosphorus ions.

5. Alum (aluminum sulfate) as a specific precipitant for phosphorus as phosphate and a general flocculent for algae, microbes, and organic molecules. Alum treatment of an aquatic system is quite expensive because the process requires titration of the total alkalinity of the water to a pH of 6.5 before the aluminum can effectively act on the target phosphorus. The treatment is short lived as the phosphorus is released exponentially as the pH of the water rises above the 6.5 point. An additional problem with the alum treatment is that the sulfate which, is left in the solution will later become sulfide under anerobic microbial activity and aid in the release of the phosphorus which has been flocculated. Eventually alum treatments can no longer precipitate phosphorus from the water column.

6. Ferric chloride is used as a water treatment chemical as a general flocculent. The cost per pound of phosphorus removed is comparable to that of the alum and it leaves free chloride ions in the water. Free chloride ions interact to release the phosphorus from the sediments. The more chloride, the poorer the sediment retention of phosphorus and sulfur, and the more difficult it becomes to cause the precipitation.

7. Ferric sulfate is used in much the same way that ferric chloride is used with the residual problems of the sulfate contributing a substantial quantity of sulfide ion in the sediment. Since the sulfur is used in equal quantities with the iron, there is likely to be no net positive long term effect.

8. Aeration is often used as a means of controlling the recycling of phosphorus in aquatic systems by maintaining the available iron in the system in the ferric state ($Fe^{+3}$) where the solubility product is about 1000 times lower than the ferrous state iron ($Fe^{+2}$). The available iron is then able to bind more phosphorus at the sediment interface. The limit here is the quantity of available iron and the maintenance of the sulfur as sulfate ion. The system is expensive to install and operate since all the effective systems are electric motor driven. Also, open water must be maintained throughout the year to sustain the gains as an artificial aerobic environment which will crash if the air flow, which drives the systematics, is not sustained thus creating a serious safety danger of someone falling through the thin ice of lakes in the northern regions.

U.S. Pat. No. 4,008,169 to Patrick John McGauley discloses a preparation of iron oxide sorbent for sulfur oxides. The McGauley patent discloses a method for preparing, at elevated temperature, an active iron oxide sorbent which is used to remove sulfur oxides from, e.g., omission gases. No mention is made of the removal of sulfur from aqueous media.

U.S. Pat. No. 4,202,864 to Jerome S. Spevack discloses a process for removing, intre alia, hydrogen sulfide from steam. The '864 patent discloses the process of contacting the impure steam with an aqueous dispersion of at least one metal compound which is capable of reacting with the hydrogen sulfide and forming a solid metal sulfide reaction product, for example an iron, zinc or copper compound. No mention of treating aqueous media is made in the '864 patent.

P. J. Dillon et al. in "Retention and resuspension of Phosphorus, Nitrogen and Iron in a Central Ontario Lake", 47 *J. Fish.,* Aquat. Sci, 1269 (1990), disclose the monitoring of phosphorus, nitrogen and iron sedimentation in a Canadian Lake. No mention is made of removing excessive amounts of any particular species.

The following patents are referenced:

| | | |
|---|---|---|
| U.S. Pat. No. 4,108,771 | Weiss | Issued Aug. 22, 1978 |
| U.S. Pat. No. 4,209,575 | Bykowski et al | Issued June 14, 1977 |
| U.S. Pat. No. 4,507,206 | Hughes | Issued Mar. 26, 1985 |
| U.S. Pat. No. 3,388,060 | Clark et al | Issued June 11, 1968 |
| U.S. Pat. No. 3,423,309 | Albertson | Issued Jan. 21, 1969 |
| U.S. Pat. No. 3,480,144 | Barth et al | Issued Nov. 25, 1969 |
| U.S. Pat. No. 3,522,173 | Lindman et al | Issued July 28, 1970 |
| U.S. Pat. No. 3,617,569 | Daniels | Issued Nov. 2, 1971 |
| U.S. Pat. No. 3,655,552 | Flock Jr. et al | Issued Apr. 11, 1972 |
| U.S. Pat. No. 4,267,058 | Kyri et al | Issued May 12, 1981 |
| U.S. Pat. No. 3,730,882 | Levin et al | Issued May 1, 1973 |
| U.S. Pat. No. 4,476,027 | Fox | Issued Oct. 9, 1984 |
| U.S. Pat. No. 4,566,975 | Allgulin | Issued Jan. 28, 1986 |
| U.S. Pat. No. 4,695,384 | Ripl et al | Issued Sep. 22, 1987 |
| U.S. Pat. No. 4,717,558 | Beck et al | Issued Jan. 5, 1988 |

The present invention is neither disclosed nor suggested, alone or in combination, by any of the prior art referred to above.

SUMMARY OF THE INVENTION

The application, according to the invention, of ferric iron ($Fe^{+3}$) nutrient binding material to the sediments of aquatic and aqueous environments in the presence of certain requisite microbe(s) provides a microbe-mediated binding action for water and/or soil treatment. In water treatment it locks up sulfur and phosphorus in a very low, soluble form making them unavailable as nutrients for plant growth. This starvation of the aquatic plants has had remarkable results within a matter of months. At the same time it utilizes hydrocarbons and other organics in the sediment or soil as carbon sources, ultimately converting them to respiration by-products such as carbon dioxide, water and methane to oxidize the sediment and reduce its thickness. For example, nutrient loads in an experimentally treated bay of Trillium Lake near Longville, Minn. were decreased by the methods of this invention from over 350 parts per billion to less than 50 ppb in less than 4 months and remain at less than 26 ppb after one year. The clarity of the water has been improved from less than 18" Secci disc readings to 7' in the same length of time. Similarly dramatic results have been achieved experimentally by the invention at a pond in Deephaven, Minn. where the entire 1.5 acre water area was totally choked with algae and duckweed. After 18 months the phosphorus levels are 29 ppb. and the water remains clear. In addition, the hydrogen sulfide smell was immediately removed from the Deephaven pond while the treatment was being completed. Most importantly, no effects on the fish and invertebrate populations in these lakes and ponds has been observed and a resurgence of some fish populations in the bay of Trillium Lake has been seen. The types of water environments that can be treated with a five year plan design according to the invention are numerous and include natural lakes, streams and ponds, man made reservoirs, waste water treatment ponds, commercial food processing facilities, individual public or private septic systems and cattle feedlot operations. In cases where the influx of new nutrients can be stopped, the treatment may well be permanent.

Attention to the fact that the method oxidizes organics, including hydrocarbons, in the sediment was just called to the inventors attention by the Lake Associations at Trillium Lake and at Lake Martha after these lakes had undergone treatment. It was reported that, whereas prior to the treatment the sediment was thigh deep in these lakes, nine months after treatment the sediment depth was reported to be only ankle deep. Subsequent laboratory study of sediment samples from these lakes conferred that the method was in fact also useful in reducing hydrocarbons and other organics in the sediment.

The method of the invention involves several considerations. First, the exact formulation of nutrient binding material and the dosage used in the process is determined by a testing program which measures the levels of nutrients and heavy metals in the aquatic system and active sediments. Where there is a question of availability of the requisite microbes, a Most Probable Number Test can be performed on the active sediments and the response to treatment under laboratory conditions can be determined. This will also determine the presence or absence of the requisite microbe(s). Second, permits are required by many states. Third, the application of the recommended amounts and type of nutrient binding materials can be performed on open water or through safe, winter ice and inoculation with the requisite microbe(s) can be accomplished, if required. Fourth, a follow-up testing program to monitor the changes in water chemistry is usually performed.

Briefly, in one aspect, the present invention is a method or process for permanently decreasing and even removing excessive, undesirable or unwanted sulfur and phosphorus species from aqueous sedimentary systems. The method comprises the step of making available in the aqueous system, containing an excessive concentration or unwanted amount of sulfur species and phosphorus species, ferric iron ($Fe^{+3}$) as an electron acceptor and a precursor of $Fe^{+2}$ a nutrient binding material in the presence of the requisite microbe(s). The $Fe^{+3}$ is obtained from the source group consisting of elemental iron, iron carbonates or iron oxides ($Fe_2O_3$ and $Fe_3O_4$). In the practice of the invention, sulfur or phosphorus are bound and removed by precipitation from the aqueous system. As already indicated, the method is microbe mediated and requires excess $Fe^{+3}$ in the system. The terms "sulfur species" and "phosphorus species" as used herein are broadly intended to mean ionic forms of sulfur or phosphorus, in a negatively charged state, which can exist in an aqueous environment. In a preferred practice, the aqueous system is an aquatic environment. "Aquatic environments" as the term is used here includes but is not restricted to natural lakes, ponds and streams, ornamental ponds and streams, industrial and municipal sewage treatment ponds, and natural or man made wild rice beds or paddies having a sedimentary layer and a water/sediment interface. "Aqueous systems", in the terminology of this invention, includes aquatic environments but also includes sedimentary systems per se such as the filtering system beneath a septic distribution field, or artificial lake or stream shoreline treatments, with or without overflow sites to lakes. It also includes drainage areas around a pond or the like. For example, in one aspect of the invention, elemental iron may be buried in a trench surrounding a pond to be oxidized aerobically or anaerobically to the ferrus $Fe^{+2}$ state to intercept phosphorous and sulfur laden drainage water before it reaches the pond. The method of the invention operates in such a situation to bind the nutrients before entering the pond. This is also considered an aqueous/sedimentary system. This invention is applicable in essentially any aqueous/sedimentary system in which control of sulfur and phosphorus is desired. It also controls concentrations of heavy metals such as mercury (Hg), and the like.

In a further practice of the invention, the method involves the further steps of a) determining the presence or absence of the requisite microbes and inoculating the sediment of the system with same if necessary; b) determining the total amounts of sulfur species and phosphorus species in the aqueous system including about the top 20 cm of sediment:

c) calculating a ratio of iron to sulfur or phosphorus in the range of at least 1.2 molar equivalents of iron to sulfur phosphorus equivalent; d) adding sufficient ferrous iron source material ($Fe^{+2}$) to the system to create an iron/sulfur phosphorus ratio of excess $Fe^{+2}$. In addition to the above minimum, additional iron species are preferably added to the system to provide sufficient iron to form precipitates with the likely quantities of incoming future sulfur and phosphorus species in the near future. Retreatment, in accordance with this invention, in, e.g., the range of 1 to 5 years, is typically contemplated.

On the other hand, the method may be carried out by simply adding the source iron and waiting to see if activation occurs. If it does not, the inoculation of the microbe(s) may be carried out to initiate activation.

As a further aspect of this invention, iron, in a loosely bound ionic condition can be used to selectively control sulfur and phosphorus movement through soils and so can be used as a design controllable barrier to the movement of these chemicals. In an anaerobic environment, the emission of foul smelling hydrogen sulfide gas can be halted by the introduction of iron. It is theorized that the iron is activated aerobically and anaerobically by naturally occurring microbial populations. If not present, they are added to a level appropriate to initiate activity.

Along this line, the method may also be used for removing unwanted hydrocarbons and other organics including pesticides from soil as will be described further hereinbelow.

DETAILED DESCRIPTION OF THE INVENTION

Figure 1:
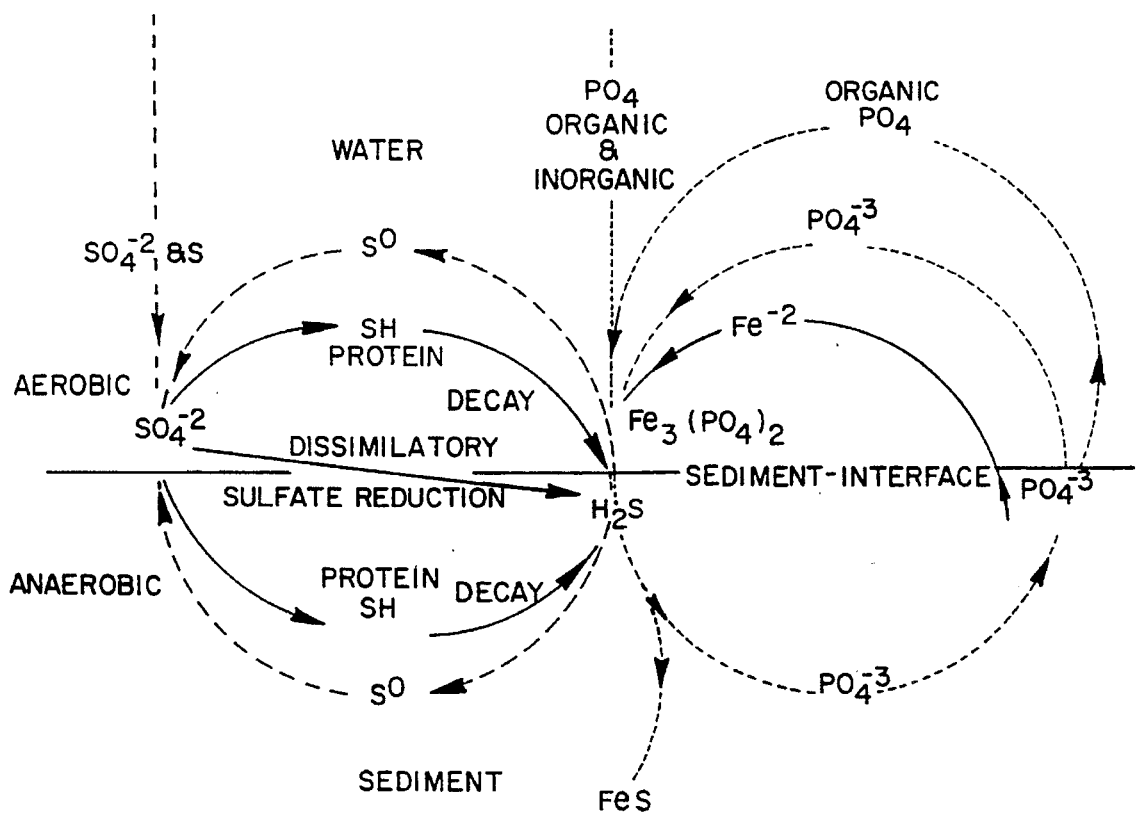
FIG. 1 shows the cyclical, vertical movement of sulfur and phosphorus into and out of the sediment interface in an aquatic environment.

While this invention may be embodied in many different forms, there are described in detail herein specific preferred embodiments of the invention. This description is an exemplification of the principles of the invention and is not intended to limit the invention to the particular embodiments illustrated.

The practice of the present invention achieves several objectives and advantages. The objectives and advantages are:

1. To reverse the eutrophication process in natural lakes, ponds, and streams by decreasing the recyclable nutrients sulfur and phosphorus, through the establishment of at least 1.2×molar equivalent amounts of iron ($Fe^{+2}$) therein relative to sulfur and phosphorus (hereinafter referred to as excess iron).

2. To establish excess amounts of iron ($Fe^{+2}$) relative to sulfur and phosphorus in aqueous systems, particularly aquatic environments such as natural basin swimming pools, ornamental ponds, septic tanks, secondary sewage treatment lagoons, rice paddies, septic systems, primary sewage treatment lagoons, cattle and hog manure ponds, and industrial treatment ponds i.e., all aqueous/sedimentary systems.

3. To establish excess amounts of iron ($Fe^{+2}$) relative to phosphorus and sulfur on soils in terrestrial environments such as lake and stream shorelines, septic system distribution trenches, and wetland overflow sites to lakes.

4. To indirectly manage aquatic plant systems in boat access areas, and swimming beaches without the use of toxic herbicides or total disruption of the aquatic environment. When sulfur and phosphorus are controlled or reduced in accordance with this invention general reduction of plant density in a vegetation bed can be achieved.

5. To utilize ferrous iron ($Fe^{+2}$) as a nutrient binding material which does not contribute to an increase in the levels of sulfur or chloride in aqueous systems.

6. To utilize iron as a nutrient binding material which is environmentally acceptable because it already occurs as a natural binder in the aquatic sediments which can be applied in a non-toxic manner and which can be applied in formula derived quantities as follows:

TP=total phosphorus, inorganic and organic
TS=total sulfur, inorganic and organic
Fe=iron as $Fe^{+2}$, $Fe^{+3}$, or $Fe^{0}$
L/$Ft^3$=liters per cubic foot
mg/L=milligrams per liter
g/m P=grams per mole of phosphorus
Total iron sediment treatment (pounds)=Lake Area (Ft)× Epilimnetic Component+Hypolimnetic Area×Hypolimnetic Component+Sediment Area×Sediment Component+Watershed Component+Number of years between treatments.

Epilimnetic Component $$\text{Iron Requirement in Pounds per Square Foot} = \frac{(\text{Average Depth Feet}) \times 28.32 \text{ L/Ft}^3 \times \left(\left(\frac{TP \text{ mg/L}}{30.97 \text{ g/m } P}\right) + \left(\frac{TS \text{ mg/L}}{32.06 \text{ g/m } S}\right)\right) \times (55.85 \text{ g/mole Fe})}{(1000 \text{ mg/g}) \times (454 \text{ grams/pound})}$$

Hypolimnetic Component $$\text{Iron Requirement in Pounds per Square Foot} = \frac{(\text{Average Depth Feet}) \times (28.32 \text{ L/Ft}^3) \times \left(\left(\frac{TP \text{ mg/L}}{30.97 \text{ g/m } P}\right) + \left(\frac{TS \text{ mg/L}}{32.06 \text{ g/m } S}\right)\right) \times (55.85 \text{ g/mole Fe})}{(1000 \text{ mg/g}) \times (454 \text{ grams/pound})}$$

-continued
Sediment Component

Sediment Iron Requirement in Pounds per Square Foot =

$$\frac{(0.656 \text{ Feet}) \times (28.32 \text{ L/Ft}^3) \times \left( \left( \frac{TP \text{ mg/L}}{30.97 \text{ g/m } P} \right) + \left( \frac{TS \text{ mg/L}}{32.06 \text{ g/m } S} \right) \right) \times (55.85 \text{ g/mole Fe})}{(1000 \text{ mg/g}) \times (454 \text{ grams/pound})}$$

Watershed Component

Sediment Iron Requirement in Pounds per Square Foot =

$$\frac{(\text{Annual Runoff Ft}^3) \times (28.32 \text{ L/Ft}^3) \times \left( \left( \frac{TP \text{ mg/L}}{30.97 \text{ g/m } P} \right) + \left( \frac{TS \text{ mg/L}}{32.06 \text{ g/m } S} \right) \right) \times (55.85 \text{ g/mole Fe})}{(1000 \text{ mg/g}) \times (454 \text{ grams/pound})}$$

7. To provide for water treatment generally.

8. To remove hydrocarbons and other organics from sediment and soil.

Figure 2:
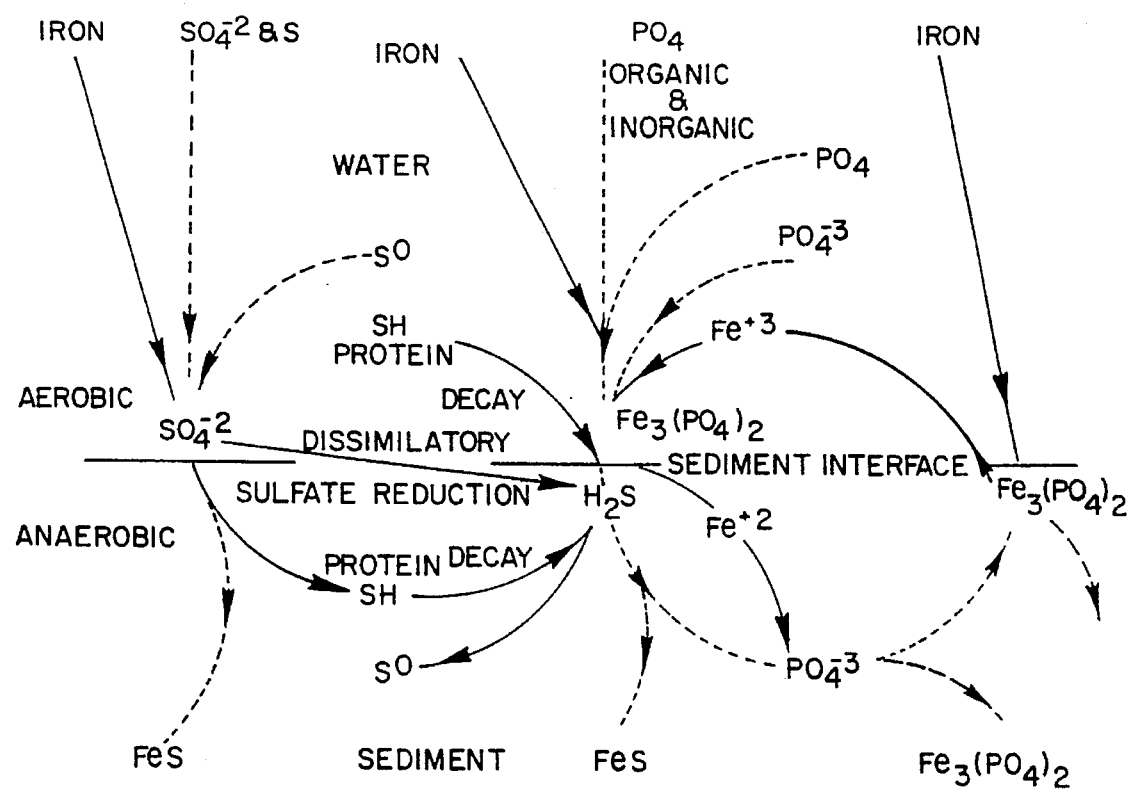
FIG. 2 shows the disruption of the recycling of phosphorus and the binding of both sulfur and phosphorus by the addition of iron.

Reference is now made to FIGS. 1 and 2 wherein the following definitions are applicable:

1. SEDIMENT: The combined remains of partially decomposed biological materials and inorganic mineral precipitants. The biological interactions which control virtually all of aquatic processes take place in the upper level of the sediment to a depth of approximately 2.5 inches.

2. SEDIMENT INTERFACE: The contact plane between the sediments and the upper aquatic environment. The existence or nonexistence of free dissolved oxygen at this plane determines the types of biological and chemical reactions which will take place.

3. AEROBIC: An oxygen containing environment, may refer to water or air.

4. ANAEROBIC: An environment which has become substantially depleted of free oxygen.

5. $SO_4^{-2}$: Negatively charged sulfate ion in solution with a comparable number of positively charged ions with the total charge in balance.

6. $S^{-2}$: Negatively charged sulfide ion in solution with a comparable charge of positive ions.

7. SH PROTEIN: Sulfur or thiol protein. Very important in amino acids because they are the binding cross links for protein formation which allows the mating biochemical fit to function. Without sufficient sulfur protein subsequent biochemical reactions slow having a net effect on the trophic state of the aquatic environment.

8. DISSIMILATORY SULFATE REDUCTION: Biochemically driven stripping of the four oxygens from the sulfate ion and thus reducing it to the sulfide ion ($S^{-2}$).

9. $H_2S$: Hydrogen sulfide is a very toxic, malodorous, gas which is highly soluble in water and directly responsible for the reaction which releases phosphorus, a growth limiting nutrient, from the aquatic bottom sediments.

10. FeS: Ferrous sulfide is a chemical compound comprised of one ion of iron and one ion of sulfide which exists in an anaerobic environment. The formation of ferrous sulfide with its very low solubility product, $10^{-17}$, is an excellent means to control hydrogen sulfide release.

11. $PO_4$ ORGANIC: Biochemical organic phosphorus is found in many important biological reaction positions. In the adenosine phosphate family it is crucial in cellular energy transfer and as part of the phospholipid makes up the critical cell wall.

12. $PO_4^{-3}$ INORGANIC: Phosphate ion is made up of an ionically bound phosphorus and four oxygens. They are primarily available as a nutrient to biochemical reactions from the solubilized ionic state. The availability of this ion has a very high correlation with the trophic state of the aquatic environment.

13. $Fe^{+3}$: Ferric iron is the ionic form of soluble iron in an aerobic environment. Because of its limited solubility product, $10^{-15}$, the concentration in an aerobic environment is usually small. It is important as the precipitation agent for ionic phosphorus in the aerobic environment.

14. $Fe^{+2}$: Ferrous iron is~the reduced ionic form of iron found in an anaerobic aqueous system or aquatic environment. Its primary role in this case is as the binding agent for sulfide and phosphate in the aquatic sediments and the aerobic environment.

15. $Fe_3(PO_4)_2$: Ferrous phosphate is a chemical compound formed by the bonding of ferrous iron to the phosphate ion. The low solubility product of this compound prevents the reintroduction of the phosphate ion to the epilimnetic aquatic environment.

16. IRON: Iron added to the system in the practice of this invention in the form of elemental iron ($Fe^0$), or in preferred practices, ferric ion (3+) or ferrous ion (2+) from $Fe_2O_3$, $Fe_3O_4$, siderite ($FeCO_3$) and mixtures thereof.

17. EPILIMNION: Epilimnion is the oxygenated portion of a body of water.

18. HYPOLIMNION: Hypolimnion is the anoxic volume of water only seasonally available for aeration at the spring and fall turnovers.

19. METALIMNION: Metalimnion is the transition band of water between the epilimnion and the hypolimnion and is an intergrade of both.

FIG. 1 shows the sulfur and phosphorus cycle as it would occur naturally in the aquatic environments of the type defined herein. As indicated, sulfur species and phosphorus species, usually in the form of organic and inorganic sulfate phosphate and sulfate ions, enter the ecosystem from any of a number of normal biological processes. The oxidation state of phosphorus or sulfur may change during the cycle, sulfate being reduced to elemental sulfur and ultimately to sulfide. It is the reduction to sulfide which generates the particularly objectionable hydrogen sulfide characterized by its rotten egg smell. The primary sediment produced in the cycle, iron sulfide, is, of course, limited by the available quantity of naturally-occurring environmental iron. But for production of the substantially insoluble iron sulfide precipitate, the sulfur/phosphorus cycles continue with normal changes in oxidation state of both the sulfur and phosphorus.

Also shown in the center of FIG. 1 is the exchange between sulfur and phosphorus. This exchange has the net effect of releasing phosphate into the right-hand cycle where it can return to the environment. The phosphorus portion of the cycle on the right-hand side of FIG. 1 indicates no substantial change in the oxidation state of the phosphorus and iron. Thus, normal sediment interface exchange is permitted between aerobic and anaerobic environments.

FIG. 2 shows the same aquatic sulfur and phosphorus cycle as depicted in FIG. 1 as it is influenced by the practice of the present invention. As shown, one or more iron species or sources, as defined herein to provide $Fe^{+2}$, are intentionally added to the system but permitted to interact with and react with aquatic sulfur and phosphorus. The reaction product of $Fe^{+2}$ with aquatic phosphate, or sulfide is the substantially insoluble iron sulfide or iron phosphate, as shown. Iron precipitates as shown in FIG. 2, are very stable and sparingly soluble in water: the net effect of these factors then is to remove excess sulfur and phosphorus from the aquatic sulfur and phosphorus cycle. By this means, objectionable densities of aquatic vegetation such as Eurasian milfoil and filamentous algae may be eliminated or reduced. Propagation of submerged aquatic vegetation and free-floating aquatic vegetation such as algae and macrophytes also may be controlled. Objectionable odors and bubbling also are eliminated or reduced and the overall appearance and utility of the body of water is significantly enhanced.

As discussed above, the present invention contemplates the intentional addition of various iron species or sources selected from the group of elemental iron, iron carbonates and iron oxides ($Fe_2O_3$ and $Fe_3O_4$) as sources of $Fe^{+2}$ and $Fe^{+3}$ iron. These categories of materials are to be broadly interpreted to accomplish the objectives and advantages of the present invention. Elemental and ionic forms of iron from these sources serve to remove the objectionable sulfur and phosphorus species described above. Specific colloquial names of iron species within the scope of this definition include limnalite, magnetite, and hematite, including taconite. Other sources of iron useful in this invention can include, for example, grinding sludge from cast iron, or cast iron machining chips or pulverized cast iron from an iron metal working operation, as a source of elemental iron. Utilization of any of these sources of iron is particularly advantageous because sludge from grinding operations now normally ends up in land fills.

More specifically, and as already indicated, a primary concept behind this invention is to control and/or decrease or even remove sulfides, phosphates and a variety of heavy metals (Hg, Pb, Cu, Ni, Zn, Cr and Mn) from aqueous/sedimentary systems, both natural and artificial, by the use of iron, iron oxide, or iron carbonate with microbe mediation. Those contaminants, particularly sulfur and phosphate, recycle between the sediment and water columns in such systems. In the water they support algae and plant growth. By aqueous/sedimentary systems it is meant to include any aqueous systems having a sedimentary layer, whether deep, including an aerobic zone or shallow, including an aerobic zone only, in natural ponds or lakes and also including artificial waste treatment ponds and sewage treatment systems and the like. A waste treatment system is nothing more than a hypereutrophic lake or pond and the subject method will work well in the stabilization pond of any waste treatment system or septic tank or the like.

ELEMENTAL IRON ($Fe^0$) AS A SOURCE OF $Fe^{+2}$ and $Fe^{+3}$

Elemental iron ($Fe^0$) oxidizes in aqueous systems under either an aerobic environment (shallow ponds for example) or anaerobic environments (a deep pond or lake for example). Under an aerobic environment $Fe^0$ oxidizes spontaneously, because such an environment is oxygenated, to form $Fe(OH)_3$ i.e., ferric iron ($Fe^{+3}$). The $Fe(OH)_3$ precipitates to the sediment and would not ordinarily react further except for microbe mediation. In the presence of the requisite microbe, the $Fe^{+3}$ of $Fe(OH)_3$ is reduced to the more soluble Ferrous ($Fe^{+2}$) form. Thus the iron resolubilizes to precipitate $Fe_3(PO_4)_2$ and FeS which are less soluble than $Fe(OH)_3$. So long as excess $Fe^{-2}$ is provided the preferential solubilization of $Fe(OH)_3$ occurs and the $Fe_3(PO_4)_2$ and FeS are formed. Both have very low solubility products and thus are kept out of the epilimnetic water.

Under anaerobic conditions, as in the deep part of a pond or take and in the sediment thereof, the spontaneous oxidation of $Fe^0$ occurs only to a minor degree in the presence of weak acids such as hydrogen sulfide or bisulfide. However, microbe mediation, in the presence of the requisite microbe, directly oxidizes $Fe^0$ to $Fe^{+2}$. This produces the same activation result as described above for the aerobic condition to tie-up $S^{-2}$ and $PO_4^{-3}$ so long as excess $Fe^{+2}$ is made available.

Consequently, in both conditions, aerobic and anaerobic, the additions of excess amounts of $Fe^0$ produces excess $Fe^{+2}$ which, through microbe mediation, solubilizes the iron.

In both instances, a microbe(s) has been discovered but not yet identified which reduces $S^{-2}$ to $S^0$ i.e., elemental sulfur to further tie-up sulfur. Also, in both instances, the sediment acts as a nutrient sink.

As to the requisite microbe(s) for mediation of this method, they may be present in some natural lakes and ponds or they may not be. In accordance with the invention, it is preferable as a part of the treatment method to make such a determination and act accordingly. This is done by performing a test on the particular aqueous/sediment system to be treated by taking a sample of the water and sediment, adding excess $Fe^0$ to it and waiting to see if activation occurs. Activation is readily observed by $CO_2$ formation, bubbling, microbial floc formations and increase of turbidity at the water/sediment interface. This can occur in a lab sample overnight or within a few days. In a pond or the like, it may take a few weeks and can be expected to be fully operational within 3–4 months. If activation does not occur, it can be concluded that inoculation of the system with a sample of sediment from an already activated system or from the depository microbes must be performed before the method can be completed.

Inoculant samples are available from at least the following lakes and ponds which are known to have activated upon treatment according to this invention and therefore, are known to contain the requisite microbe(s) for accomplishing the oxidation of $Fe^0$ to $Fe^{+2}$, the reduction of $Fe^{+3}$ to $Fe^{+2}$ and the reduction of $S^{-2}$ to $S^0$, as required by this invention.

Trillium Lake. Hackensack, Minn.
Lake Martha, Buffalo, Minn.
Peavey Lake, Wayzata, Minn.
Others are found in Table 4.

A sample of the microbe(s) was also deposited with the American Type Culture Collection (ATCC), Patent Depository of 12301 Parklawn Drive, Rockville, Md. 20852, on Jul. 8, 1992 under number ATCC 55339. Under the contractual terms with ATCC, the inventors have secured assurance of permanent availability of the deposit to the public.

While the microbe(s) involved are believed to be a mixed culture and are believed to be classified as *Thiobacillus ferooxidans* and/or *Alteromonas Putrefaciens*, and/or GS-15 (Applied and Environmental Microbiology, Mar. 1989, p. 700–706), no definitive information is available at this time as to its taxonomic description, except to refer to the actual deposit of the microbe(s) involved or activated samples taken from existing systems, either of which is regarded as a more reliable disclosure and/or enablement than a mere binomial description in any event. This is particularly true with respect to the deposit referred to immediately above. *Ex part Davidson*, 118 USPQ520 (Pat. Off. Bd. App. 1957).

Thus, even though the identity of the microbe(s) is not known, they are readily available to practice this invention, as needed. They may be obtained from the ATCC or by taking anaerobic samples of water and sediment from any of the above ponds and lakes. It is presently believed that the microbe(s) are faculative anaerobes which can be easily collected under ambient conditions even though they may need anaerobic conditions to perform as required.

When activation of the test sample does occur with or without inoculation, a determination as to the amount of excess $Fe^{+2}$ and excess iron source material as the source of $Fe^{+2}$ to be added to the system to be treated must be made based on the formula provided above, for example.

Having made the two determinations described above i.e., availability of requisite microbe(s) and amount of iron needed, and inoculating the system if required, the method is then completed by adding the excess amount of $Fe^0$ as calculated to supply excess $Fe^{+2}$ for so long as stabilization is desired. Repeat treatments may be contemplated on an annual or every five year basis, for example.

$Fe_3O_4$, $Fe_2O_3$, $FeCO_3$ AS A SOURCE OF $Fe^{+2}$

Since elemental iron ($Fe^0$) is expensive, it is not ordinarily economical to contemplate its use on large lakes and ponds. Fortunately, large systems are anaerobic in that they are deep enough to have an upper aerobic surface layer (Epilimnion), a deep anaerobic layer (Hypolymnion), an intermediate layer (Metalimnion) and an anaerobic sediment. In such an instance, $Fe_3O_4$, $Fe_2O_3$, and $FeCO_3$ may be used as a source of $Fe^{+2}$.

$Fe_3O_4$ is naturally available as magnetite. $Fe_2O_3$ is hematite and a preferred form precessed from magnetite and known as taconite, particularly chips or a fine grind (–320 mesh), is readily available. $Fe_3O_4$ is available as a fine grind. These are all initial sources of $Fe^{+3}$ upon being added to the water of an anaerobic aqueous/sediment system to be treated. As before, in the presence of the requisite microbe (inoculated as before if needed for activation) the $Fe^{+3}$ forms $Fe(OH)_3$ which precipitates to the sediment where microbe mediation causes the $Fe^{+3}$ to be reduced to $Fe^{+2}$, resulting in the resolubilization of the iron and the same cycle as already described above for $Fe^0$ occurs to tie-up phosphorous and sulfur in the sediment.

The interaction between the anaerobic hypolymmon and the aerobic epilimnion of the lake, pond or waste treatment system, etc., is one of recycling the solubilized $Fe^{+2}$ to the Metalimnion. When the $Fe^{+2}$ comes in contact with the oxygen it spontaneously oxidizes to $Fe^{+3}$ and is reprecipitated as $Fe(PO_4)_2$ or the hydroxide. The shortage of available oxygen at the bottom of the metalimnion allows the $Fe(PO_4)$ to predominate thus depleting the available recycling phosphorous. A similar process reduces sulfate by microbe mediation in the anaerobic hypolimmon to sulfide where it is precipitated as ferrous sulfide and later oxidized in the presence of $Fe^{+3}$ and microbes to elemental sulfur $S^0$.

Along the shoreline shallows, which are aerobic, the treatment can be supplemented by the addition of elemental iron ($Fe^0$) as already described.

The many advantages of the present invention are illustrated by the attached experimental examples.

EXAMPLE 1

A pond owned by Mr. H. M. Baskerville in Deephaven, Minn. of approximately 1.5 acres in size and having a typical water depth of 4 ft. or less was experimentally treated in accordance with the present invention. The pond surface, before initial treatment, was covered with coontail and duckweed which were strung together with epiphetic filamentous algae. Water samples were collected to determine the state of phosphorus species and sulfur species in the lake at the start of treatment. Also, as observed, bubbling of $CO_2$, methane and hydrogen sulfide was at the surface of the water. There was also a strong odor of rotten egg due to the presence of hydrogen sulfide gas.

Eleven hundred pounds of iron filings, or shavings, were spread by hand over the entire area of pond. The shavings had dimensions of 0.003 inches by 1/32 inch by 1/8 inch and were dispersed by hand from a row boat in six to eight runs for approximately a four hour time period.

Toward the end of the four hours spent dispensing iron, surprisingly and unexpectedly, the objectionable rotten egg odor of the pond had been significantly reduced as had the appearance of gas bubbles at the surface of the pond. The detection limit for hydrogen sulfide in the human olfactory system is a few parts per trillion. The sulfide was presumably bound ionically to the iron particulates as a replacement for the oxygen on an oxidized layer. There is still no detectable odor of hydrogen sulfide at this date, 18 months following the experimental treatment.

At various time periods subsequent to the above-described application of elemental iron to the pond, water samples were obtained and analyzed for phosphorus and sulfur. The phosphorus levels were reduced from 338 parts per billion to 20 parts per billion within 6 months and have remained at a suppressed level. The algae and plant growth which totally choked the pond has been suppressed to the point that Secchi Disk readings of 3 feet were possible throughout the entire year following treatment whereas such readings were not possible prior to treatment because the disk was supported on the water surface by plants and algae.

A dramatic immediate reduction in both sulfur and phosphorus occurred within as little as two weeks after treatment by the present invention. Moreover, the reduction in levels of sulfur and phosphorus obtained by treatment by the present invention continued for as long as three months after a single application. Also, the results indicate that the appropriate microbial level was naturally present. Additional excess iron would have prolonged the effect.

EXAMPLE 2

Ten aerobic and five anaerobic aqueous environments were prepared with water and sediment materials secured from a 1/4 acre pond off St. Albins Bay on Lake Minnetonka, Minn. to test the present invention. Five of the aerobic environments were assembled to contain water and sediment (WS). Five additional environments contained plants, water and sediment (PWS). The ten aerobic environments were created in ten gallon aquariums which contained approximately eight gallons of water and two gallons of sediment. The five anaerobic environments (A) were created in four gallon sealed pails. The pails contained approximately two inches of sediment and sufficient water substantially to fill the pail. Two control environments were designated in each of the three classes of ecosystems. Iron shavings, magnetite and cast iron grinding sludge, respectively, was added to each of the remaining three environments. While the form of the iron was different, a quantity of each of the three iron sources was computed to provide iron at the rate of about 7 gm of iron per square foot of bottom sediment. Periodically, thereafter, samples of water from the anaerobic and aerobic environments were withdrawn and tested for phosphorus and sulfide content. At the same time, samples were withdrawn from the control environments and similarly analyzed for phosphorus and sulfide content. While the results were not entirely consistent, the general trends indicated:

1. In the course of approximately ten weeks with four analyses subsequent to the initial analysis, the phosphorus levels on a part per billion basis in the WS, PWS and A control environments increased while the phosphorus levels in treated environments declined, as shown in Table 1 below:

TABLE 1

|     | Mean Control | Mean Treated | Net Difference |
| --- | --- | --- | --- |
| WS  | +240% | −57% | 297% |
| PWS | +169% | −59% | 228% |
| A   | +646% | −84% | 730% |

2. Sulfur levels in the PW, PWS, and A treated and control environments changed according to Table 2 as follows:

TABLE 2

|     | Mean Control | Mean Treated | Net Difference |
| --- | --- | --- | --- |
| WS  | +68% | −4% | 72% |
| PWS | +26% | −35% | 71% |
| A   | +14% | −9% | 23% |

EXAMPLE 3

Evidence for microbial activation of the iron and its subsequent reactions is drawn from a laboratory, experiment consisting of twelve 2.5 liter bottles each containing one liter of untreated sediments from the main bay of Trillium Lake near Hackensack, Minn. This lake was determined to be one which self-activated on treatment and therefore naturally included the requisite microbe(s). The sediment was then covered with water to the neck of the bottle and ten of the bottles were treated with magnetite $Fe_3O_4$ and two carried as controls. The bottles were also treated with sufficient standard glucose/glutamic acid solution to render them anoxic. The experiment was allowed to proceed for four months before analyzing for results. Only one of the treated samples activated and produced positive results. The iron concentration increased to 8000 ppb (parts per billion pans water) and the anoxic phosphorus was measured at 250 ppb. After exposing the sample to air for twenty four hours, the iron precipitated and left a concentration of 140 ppb in solution while the total phosphorus concentration in the sample dropped to 22 ppb. In presence of $O_2$ $Fe^{+2}$ oxidizes to $Fe^{+3}$ and binds to phosphorus. In the remaining samples and the controls the dissolved iron concentration attained an ionic level near 1000 parts per billion and the phosphorus solubility increased to near 1000 parts per billion. Subsequent exposure of the unactivated samples to the atmosphere caused the iron to precipitate and the concentrations equilibrate at about 150 ppb. The total phosphorus in these samples ranged from 900 to 1100 ppb alter atmospheric exposure for 24 hours. This shows microbial application and that they are not in every system. It shows that they can be inoculated. Ten 15 ml culture tubes were subsequently prepared from the 2.5 L bottles. Each contained 50% sediment and 50% water. Each, except the controls, was inoculated with 100 ul of the fully activated sample and incubated at 20 degrees C for 24 hours. All of the samples except the controls generated between 4000 and 6000 ug/L of $Fe^{+2}$.

EXAMPLE 4

A laboratory was set up on the shore of Trillium Lake, Hackensack, Minn. one year after experimental treatment with magnetite ($Fe_3O_4$). Ekman dredge samples were collected and immediately analyzed for $Fe^{+2}$, fixed and later analyzed for total Fe from which the $Fe^{+3}$ content could be calculated by subtraction of $Fe^{+2}$ from total iron. The resulting total iron analysis was found to be the same as the $Fe^{+2}$ concentration within experimental error, plus or minus 4%. The results showed that there was no detectable level of $Fe^{+3}$ in the sediment and that all of the treatment iron ($Fe_3O_4$) had been reduced to the $Fe^{+2}$ state. This was a complete surprise as a change of state had not been expected except for the replacement of oxygen by sulfide and phosphate. This demonstrates operation sediments.

Laboratory analysis of sediments collected from Trillium Lake by Ekman Dredge prior to sediment treatment showed substantial levels of total sulfide in the sediments and a negative redox potential. Samples collected by the means were analyzed a year after treatment for total sulfides. None were detected by the analysis. The same sample was then tested for sulfate with the same result. This was unexpected because the sulfide was thought to be bound to the iron. New samples of the treated sediments were collected, acid hydrolyzed, and analyzed for sulfide with the same result as the first tests. The sediments were then analyzed for total sulfur. The concentrations of total sulfur detected accounted for the missing sulfate in the water column as well as the missing sulfides in the sediments. The sulfate had been reduced to sulfide in the anoxic hypolimnion and the sediment sulfide had been oxidized to elemental sulfur $S^0$. Also, the color of the sediment had also changed from black to grey green streaked with light yellowish tan. The black color of lake sediments is attributed to the levels of iron sulfide found naturally in aquatic sediments and has typically exhibited a negative redox potential. The treated samples in this last test showed a positive redox potential. This is an indirect indication of a reduction in phosphate release and a cessation in the generation of sulfide.

EXAMPLE 5

Samples of water waste and sediments from a food processing plant were prepared for experimental analysis. Two samples were used as controls, one was treated with elemental iron, and one with magnetite. The samples were put away in the dark and incubated at room temperature for three months. At the end of this time they were opened and analyzed for total phosphorus. There was no significant change in the total phosphorus of any of the samples or controls at that time. All of the samples were then inoculated with lake sediments of known activation from Trillium Lake, which had been iron treated several months before. The samples were re-sealed and incubated for an additional two months. The controls did not show any reduction of total phosphorus, but both the magnetite treated sample and the elemental iron treated sample were considerably lower in total phosphorus concentration than they had been. Total phosphorus was reduced by ⅔. The control samples smelled strongly from sulfide while the iron treated samples gave no trace of sulfur compound odors. This demonstrates that inoculation from a known source is operable.

EXAMPLE 6

Two aerobic test bottles were set up with taconite. One with 0.25 inch chips which had been reduced (10%) to elemental iron; the other with minus 320 mesh taconite dust. At the end of four months the chips had growth of iron bacteria on the surface, and the concentration of phosphate in solution was down considerably when compared to the sample treated with the taconite dust. Analysis of the dust treated sample showed the majority of the iron as $Fe^{+3}$ in the dust treated sediments presumably because the aerobic sediments could not activate the taconite dust. This demonstrates $Fe^0$ activation in an aerobic environment.

EXAMPLE 7

Where elemental iron has been the treatment material of choice, drill chips from cast iron machining operations which have a thickness of about 0.003 inches were used successfully. Cast iron grindings were also used in laboratory experiments and served the purpose well. Both small and large pieces of cast iron show surface growth of iron bacteria, but because the surface to volume ratio of large pieces is very small, there is little activation.

Figure 3:
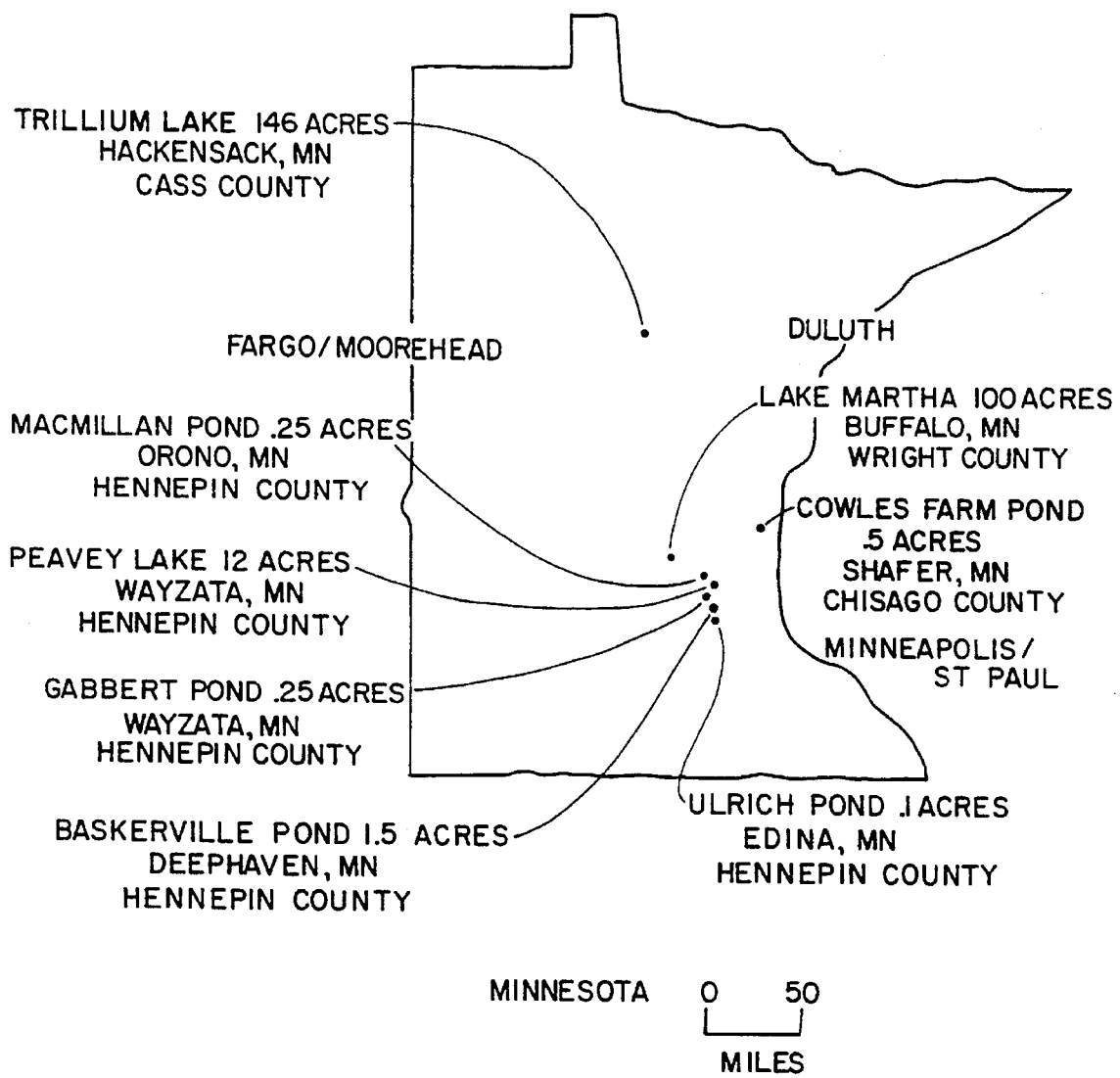
FIG. 3 is a map showing the location of the various experimental test sites in Minnesota.

Included below in Table 3 is a summary of experimental results obtained from experimental tests according to the invention on a variety of Minnesota ponds and lakes. Locations of these sites in Minnesota are shown in the map of FIG. 3.

TABLE 3

SUMMARY OF RESULTS: 25 June 1992

Macmillan Residence, Orono, Minnesota
Pond, .25 acres, 4 deep
TOTAL P, SURFACE (mg/l)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1991 |     |     |     |     |     |     |     |     |     | .390* |   |   |
| 1992 |     | .266 |    | .033 | .029 |    |     |     |     |     |     |     |

TOTAL IRON, SURFACE (mg/l)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1992 |     | 2.196 |   |     |     |     |     |     |     |     |     |     |

Cowles Farm, Shafer, Minnesota
.5 acre pond, aerated in winter, large watershed, maximum 12' deep
TOTAL P, SURFACE (mg/l)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1991 |     |     |     |     |     |     |     |     |     |     | .338* |   |
| 1992 |     | .149 |    | .039 |     | .273 |   |     |     |     |     |     |

TOTAL IRON, SURFACE (mg/l)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1992 |     | .964 |    | .081 |    | .193 |   |     |     |     |     |     |

Gabbert Residence, Wayzata, Minnesota 55391
.25 acre pond, maximum 4 deep, history of heavy algicide and herbicide use
TOTAL P, SURFACE (mg/l)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1991 |     |     |     |     |     |     |     | .618* | .162 |   |   |   |
| 1992 | .046 |    | .039 | .031 |    |     |     |     |     |     |     |     |

TOTAL IRON, SURFACE (mg/l)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1992 |     | 8.825 |   |     |     |     |     |     |     |     |     |     |

Baskerville Residence, Deephaven, Minnesota
1.5 acre pond, maximum 5 deep, connected to Lake Minnetonka
TOTAL P, SURFACE (mg/l)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1990 |     |     |     |     |     |     |     |     | .358* | .074 | .091 | .102 |
| 1991 | .062 |    | .544 | .085 |    | .046 | .072 |   | .054 |    |     |     |
| 1992 |     |     | .029 |     |     |     |     |     |     |     |     |     |

TOTAL IRON, SURFACE (mg/l)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1992 |     |     | 3.802 |   |     |     |     |     |     |     |     |     |

TOTAL SULFIDE, SURFACE (mg/l)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1990 |     |     |     |     |     |     |     |     | 36.12* | 17.47 | 12.22 | 2.39 |
| 1991 | 5.12 |   | .140 | 0 |     | 0 | 0 |     | 0 |     |     |     |

Trillium Lake, Hackensack, Minnesota
146 acres
NORTH BASIN: TOTAL P, SURFACE (mg/l)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1988 |     |     |     |     |     |     | .024 |   |     |     |     |     |
| 1992 |     | *   |     |     |     | .041 |   |     |     |     |     |     |

MIDDLE BASIN: TOTAL P, SURFACE (MG/L)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1988 |     |     |     |     |     |     | .031 |   |     |     |     |     |
| 1992 |     | *   |     |     |     | .024 |   |     |     |     |     |     |

SOUTH BASIN: TOTAL P, SURFACE (MG/L)

|      | Jan | Feb | Mar | Apr | May | Jun | Jul | Aug | Sep | Oct | Nov | Dec |
|------|-----|-----|-----|-----|-----|-----|-----|-----|-----|-----|-----|-----|
| 1988 |     |     |     |     |     |     | .027 |   |     |     |     |     |

TABLE 3-continued

SUMMARY OF RESULTS: 25 June 1992

| | Jan | Feb | Mar | Apr | May | Jun | Jul | Aug | Sep | Oct | Nov | Dec |
|---|---|---|---|---|---|---|---|---|---|---|---|---|
| 1992 | | * | .031 | | | .037 | | | | | | |

SOUTHWEST BAY: TOTAL P, SURFACE (MG/L)

| | Jan | Feb | Mar | Apr | May | Jun | Jul | Aug | Sep | Oct | Nov | Dec |
|---|---|---|---|---|---|---|---|---|---|---|---|---|
| 1988 | | | | | | | .122 | | | | | |
| 1990 | | | | | | | | .114 | | | | |
| 1991 | .068 | * | .039 | .051 | .032 | .026 | .029 | .029 | .022 | | | |
| 1992 | .026 | .035 | .049 | | | .040 | | | | | | |

NORTH BASIN: TOTAL P, HYPOLIMNION (MG/L)

| | Jan | Feb | Mar | Apr | May | Jun | Jul | Aug | Sep | Oct | Nov | Dec |
|---|---|---|---|---|---|---|---|---|---|---|---|---|
| 1988 | | | | | | | .034 | | | | | |
| 1992 | | * | | | | .075 | | | | | | |

MIDDLE BASIN: TOTAL P, HYPOLIMNION (MG/L)

| | Jan | Feb | Mar | Apr | May | Jun | Jul | Aug | Sep | Oct | Nov | Dec |
|---|---|---|---|---|---|---|---|---|---|---|---|---|
| 1988 | | | | | | | .038 | | | | | |
| 1992 | | * | | | | .035 | | | | | | |

SOUTH BASIN: TOTAL P, HYPOLIMNION (MG/L)

| | Jan | Feb | Mar | Apr | May | Jun | Jul | Aug | Sep | Oct | Nov | Dec |
|---|---|---|---|---|---|---|---|---|---|---|---|---|
| 1988 | | | | | .058 | | | | | | | |
| 1992 | | * | | | | .120 | | | | | | |

SOUTHWEST BAY: TOTAL P, HYPOLIMNION (MG/L)

| | Jan | Feb | Mar | Apr | May | Jun | Jul | Aug | Sep | Oct | Nov | Dec |
|---|---|---|---|---|---|---|---|---|---|---|---|---|
| 1988 | | | | | | | .345 | | | | | |
| 1990 | | | | | | | | .362 | | | | |
| 1991 | .288 | * | .137 | .186 | .044 | .039 | .076 | .073 | .052 | | | |
| 1992 | | .255 | .457 | | | .236 | | | | | | |

Trillium Lake, Hackensack, Minnesota
COMPOSITE TRANSPARENCY, NORTH, MIDDLE AND SOUTH BASINS
(Secci Disc Depth in Feet)

| | Jan | Feb | Mar | Apr | May | Jun | Jul | Aug | Sep | Oct | Nov | Dec |
|---|---|---|---|---|---|---|---|---|---|---|---|---|
| 1988 | | | | | | 7.0 | 5.0 | 2.5 | | | | |
| 1989 | | | | | | 10.0 | 4.5 | 1.5 | | | | |
| 1990 | | | | | | | | 1.5 | | | | |
| 1991 | | | | | 6.0 | 3.5 | 1.5 | 1.8 | 3.5 | | | |
| 1992 | | | | | | | | | | | | |

TRANSPARENCY, SOUTHWEST BAY

| | Jan | Feb | Mar | Apr | May | Jun | Jul | Aug | Sep | Oct | Nov | Dec |
|---|---|---|---|---|---|---|---|---|---|---|---|---|
| 1988 | | | | | | | | | | | | |
| 1990 | | | | | 6.0 | 3.5 | 1.5 | 1.8 | 3.5 | | | |
| 1991 | | * | | 4.5 | 7.0 | 8.0 | 6.0 | 6.5 | 6.5 | | | |
| 1992 | | | | | | | | | | | | |

NORTH BASIN TOTAL IRON: SURFACE (mg/l)

| | Jan | Feb | Mar | Apr | May | Jun | Jul | Aug | Sep | Oct | Nov | Dec |
|---|---|---|---|---|---|---|---|---|---|---|---|---|
| 1992 | | * | | | | .294 | | | | | | |

MIDDLE BASIN TOTAL IRON: SURFACE (mg/l)

| | Jan | Feb | Mar | Apr | May | Jun | Jul | Aug | Sep | Oct | Nov | Dec |
|---|---|---|---|---|---|---|---|---|---|---|---|---|
| 1992 | * | | | | .172 | | | | | | | |

SOUTH BASIN, TOTAL IRON: SURFACE (mg/l)

| | Jan | Feb | Mar | Apr | May | Jun | Jul | Aug | Sep | Oct | Nov | Dec |
|---|---|---|---|---|---|---|---|---|---|---|---|---|
| 1992 | * | .084 | | | .265 | | | | | | | |

SOUTHWEST BAY, TOTAL IRON, SURFACE (mg/l)

| | Jan | Feb | Mar | Apr | May | Jun | Jul | Aug | Sep | Oct | Nov | Dec |
|---|---|---|---|---|---|---|---|---|---|---|---|---|
| 1990 | | | | | | | | .102 | | | | |
| 1991 | .096 | * | .146 | .430 | .112 | .130 | .122 | .135 | .179 | | | |
| 1992 | | | 1.041 | | .778 | | | | | | | |

Trillium Lake, Hackensack, Minnesota
NORTH BASIN TOTAL IRON: HYPOLIMNION (mg/l)

| | Jan | Feb | Mar | Apr | May | Jun | Jul | Aug | Sep | Oct | Nov | Dec |
|---|---|---|---|---|---|---|---|---|---|---|---|---|
| 1992 | | * | | | | .1.097 | | | | | | |

MIDDLE BASIN TOTAL IRON: HYPOLIMNION (mg/l)

| | Jan | Feb | Mar | Apr | May | Jun | Jul | Aug | Sep | Oct | Nov | Dec |
|---|---|---|---|---|---|---|---|---|---|---|---|---|
| 1992 | * | | | | .243 | | | | | | | |

SOUTH BASIN, TOTAL IRON: HYPOLIMNION (mg/l)

| | Jan | Feb | Mar | Apr | May | Jun | Jul | Aug | Sep | Oct | Nov | Dec |
|---|---|---|---|---|---|---|---|---|---|---|---|---|
| 1992 | * | .354 | | | 2.022 | | | | | | | |

SOUTHWEST BAY, TOTAL IRON, HYPOLIMNION (mg/l)

| | Jan | Feb | Mar | Apr | May | Jun | Jul | Aug | Sep | Oct | Nov | Dec |
|---|---|---|---|---|---|---|---|---|---|---|---|---|
| 1990 | | | | | | | | 3.067 | | | | |
| 1991 | 2.078 | * | 3.039 | 3.275 | 3.555 | 3.735 | 3.486 | 3.272 | 2.673 | | | |
| 1992 | | 8.903 | | | 4.143 | | | | | | | |

NORTH BASIN CHLOROPHYL A (mg/l)

| | Jan | Feb | Mar | Apr | May | Jun | Jul | Aug | Sep | Oct | Nov | Dec |
|---|---|---|---|---|---|---|---|---|---|---|---|---|
| 1992 | | * | | | | 12.4 | | | | | | |

MIDDLE BASIN CHLOROPHYL A (mg/m3)

| | Jan | Feb | Mar | Apr | May | Jun | Jul | Aug | Sep | Oct | Nov | Dec |
|---|---|---|---|---|---|---|---|---|---|---|---|---|
| 1992 | | * | | | | 8.0 | | | | | | |

SOUTH BASIN, CHLOROPHYL A (mg/m3)

| | Jan | Feb | Mar | Apr | May | Jun | Jul | Aug | Sep | Oct | Nov | Dec |
|---|---|---|---|---|---|---|---|---|---|---|---|---|

TABLE 3-continued

SUMMARY OF RESULTS: 25 June 1992

| | Jan | Feb | Mar | Apr | May | Jun | Jul | Aug | Sep | Oct | Nov | Dec |
|---|---|---|---|---|---|---|---|---|---|---|---|---|
| 1992 | | * | | | | 7.6 | | | | | | |

SOUTHWEST BAY, CHLOROPHYL A (mg/m3)

| | Jan | Feb | Mar | Apr | May | Jun | Jul | Aug | Sep | Oct | Nov | Dec |
|---|---|---|---|---|---|---|---|---|---|---|---|---|
| 1992 | | | | | | 22.7 | | | | | | |

SOUTHWEST BAY, SULFIDE (mg/l)

| | Jan | Feb | Mar | Apr | May | Jun | Jul | Aug | Sep | Oct | Nov | Dec |
|---|---|---|---|---|---|---|---|---|---|---|---|---|
| 1988 | | | | | | | 7.680 | | | | | |
| 1990 | | | | | | | | 7.410 | | | | |
| 1991 | 6.28 | * | 4.06 | .0.34 | 3.21 | 2.02 | 1.84 | 1.61 | 1.08 | | | |

Lake Martha, Buffalo, Minnesota
TRANSPARENCY (Secci Disc Depth in Feet)

| | Jan | Feb | Mar | Apr | May | Jun | Jul | Aug | Sep | Oct | Nov | Dec |
|---|---|---|---|---|---|---|---|---|---|---|---|---|
| 1979 | | | | | | 4.0 | | 4.0 | | | | |
| 1981 | | | | | | 6.25 | 4.33 | 5.0 | 4.67 | | | |
| 1982 | | | | | | 8.5 | 3.37 | 3.62 | 4.67 | | | |
| 1983 | | | | | | 6.83 | 4.37 | 3.0 | 3.37 | | | |
| 1984 | | | | | | 9.37 | 3.0 | 2.25 | 2.62 | | | |
| 1985 | | | | | | 7.5 | 4.37 | 3.37 | 1.5 | | | |
| 1986 | | | | | | 8.5 | 2.87 | 2.12 | 4.5 | | | |
| 1987 | | | | | | 3.87 | 2.25 | 2.37 | 2.12 | | | |
| 1988 | | | | | | 6.0 | 1.75 | 2.0 | 2.67 | | | |
| 1989 | | | | | | 9.25 | 5.0 | 2.0 | 3.0 | | | |
| 1990 | | | | | | 5.83 | 2.83 | 1.83 | 1.75 | | | |
| 1991 | | | | | | 3.25 | 2.25 | 2.0 | 2.75 | | | |
| 1992 | | * | | 13.5 | 15.0 | 16.5 | | | | | | |

TOTAL P, SURFACE (MG/L)

| | Jan | Feb | Mar | Apr | May | Jun | Jul | Aug | Sep | Oct | Nov | Dec |
|---|---|---|---|---|---|---|---|---|---|---|---|---|
| 1979 | | | | | | .040 | .051 | .072 | | | | |
| 1985 | | | | | | | | .111 | | | | |
| 1990 | | | | | | .042 | .100 | .150 | | | | |
| 1991 | | | | | | | | | | | | |
| 1992 | .066 | * | .035 | .041 | | .024 | | | | | | |

TOTAL P, HYPOLIMNION (MG/L)

| | Jan | Feb | Mar | Apr | May | Jun | Jul | Aug | Sep | Oct | Nov | Dec |
|---|---|---|---|---|---|---|---|---|---|---|---|---|
| 1985 | | | | | | | | 96.1 | | | | |
| 1990 | | | | | | .040 | 82.1 | .173 | | | | |
| 1991 | | | | | | | | | | | | |
| 1992 | .058 | * | .036 | .038 | | .037 | | | | | | |

CHLOROPHYL A

| | Jan | Feb | Mar | Apr | May | Jun | Jul | Aug | Sep | Oct | Nov | Dec |
|---|---|---|---|---|---|---|---|---|---|---|---|---|
| 1990 | | | | | | 0.64 | | 121.0 | | | | |
| 1991 | | | | | | | | | | | | |
| 1992 | .048 | * | | | | 3.2 | | | | | | |

TOTAL IRON: SURFACE (mg/l)

| | Jan | Feb | Mar | Apr | May | Jun | Jul | Aug | Sep | Oct | Nov | Dec |
|---|---|---|---|---|---|---|---|---|---|---|---|---|
| 1992 | | * | .054 | .045 | | | .165 | | | | | |
| | | | .029 | | | | | | | | | |

TOTAL IRON: HYPOLIMNION (mg/l)

| | Jan | Feb | Mar | Apr | May | Jun | Jul | Aug | Sep | Oct | Nov | Dec |
|---|---|---|---|---|---|---|---|---|---|---|---|---|
| 1992 | .069 | * | .078 | .080 | | .240 | | | | | | |
| | | | .951 | | | | | | | | | |

Peavey Lake, Wayzata, Minnesota
TRANSPARENCY (ft)

| | Jan | Feb | Mar | Apr | May | Jun | Jul | Aug | Sep | Oct | Nov | Dec |
|---|---|---|---|---|---|---|---|---|---|---|---|---|
| 1977 | | | | | | | 5.45 | | | | | |
| 1988 | | | | | 8.86 | | 5.25 | | 4.92 | | | |
| 1989 | | | | | 3.28 | | | | 4.92 | | | |
| 1990 | | | | | 5.25 | | 2.95 | | 3.94 | | | |
| | | | | | | | 5.25 | | 5.91 | | | |
| 1991 | | | | 4.10 | | | | | | | | |
| 1992 | | * | | | 11.5 | | | | | | | |

CHLOROPHYL A

| | Jan | Feb | Mar | Apr | May | Jun | Jul | Aug | Sep | Oct | Nov | Dec |
|---|---|---|---|---|---|---|---|---|---|---|---|---|
| 1988 | | | | | 1.0 | | 4.0 | | 18.0 | | | |
| 1989 | | | | | | | 12.0 | | 14.0 | | | |
| 1990 | | | | | 2.0 | | 11.0 | | 15.0 | | | |
| | | | | | | | 3.0 | | 11.0 | | | |
| 1991 | | | | | 15.0 | | | | | | | |
| 1992 | | * | | | | 5.2 | | | | | | |

TOTAL P, SURFACE (mg/l)

| | Jan | Feb | Mar | Apr | May | Jun | Jul | Aug | Sep | Oct | Nov | Dec |
|---|---|---|---|---|---|---|---|---|---|---|---|---|
| 1959 | | | | | .900 | | | | | | | |
| 1988 | | | | | .080 | | .060 | | .080 | | | |
| 1989 | | | | | | | .080 | | .040 | | | |
| 1990 | | | | | .070 | | .140 | | .060 | | | |
| | | | | | | | .190 | | | | | |
| 1991 | | | | | .090 | | | | | | | |

TABLE 3-continued

SUMMARY OF RESULTS: 25 June 1992

| | | | | | | | | | | | | |
|---|---|---|---|---|---|---|---|---|---|---|---|---|
| 1992 | * | | | | | .053 | | | | | | |
| TOTAL P, HYPOLIMNION (mg/l) | | | | | | | | | | | | |
| | Jan | Feb | Mar | Apr | May | Jun | Jul | Aug | Sep | Oct | Nov | Dec |
| 1988 | | | | | 5.500 | 6.200 | 6.500 | | | | | |
| 1989 | | | | | | | 6.500 | 6.420 | | | | |
| 1990 | | | | | 6.600 | 2.650 | 3.170 | | | | | |
| | | | | | | | 2.490 | 7.570 | | | | |
| 1991 | | | | | 6.700 | | | | | | | |
| 1992 | * | | | | | 2.128 | | | | | | |

Peavey Lake, Wayzata, Minnesota

Test Set 1:
Heavy Metals in Sediments of Peavey Lake and Browns Bay,
Lake Minnetonka on 25 January, 1992
Tests performed by Circo Laboratories, State of Minnesota,
Certification Number 027-123-111

| Element | Mg/L Browns Bay | Mg/L Peavey Lake |
|---|---|---|
| Mercury | 0.020 | 0.043 |
| Lead | 6.800 | 5.000 |
| Cadmium | 0.450 | 0.260 |
| Copper | 3.700 | 3.200 |
| Nickel | 5.600 | 4.800 |
| Chromium | 2.400 | 1.800 |
| Zinc | 50.000 | 57.000 |

Test Set 2:
Heavy Metals Test from Anaerobic Sediments from Peavey Lake treated
with Iron Tests performed by Instrumental Research, State of Minnesota
Certification Number 027-003-130
Total Soluble Material in Water Column

| Element | Mg/L Control | Mg/L 7.99 gm/sf Iron | Mg/L 12.41 gm/sf Iron | Mg/L 70.0 gm/sf Iron |
|---|---|---|---|---|
| Total Iron | 1.197 | 1.571 | 1.634 | 2.280 |
| Mercury | 0.0034 | 0.0018 | 0.0016 | 0.0011 |
| Lead | 0.036 | 0.002 | 0.003 | 0.001 |
| Cadmium | 0.003 | 0.000 | 0.000 | 0.000 |
| Copper | 0.045 | 0.031 | 0.030 | 0.021 |
| Nickel | 0.024 | 0.013 | 0.013 | 0.007 |
| Chromium | 0.014 | 0.012 | 0.010 | 0.006 |
| Zinc | 0.048 | 0.025 | 0.021 | 0.011 |

Peavey Lake, Wayzata, Minnesota
TOTAL IRON, SURFACE (mg/l)

| | Jan | Feb | Mar | Apr | May | Jun | Jul | Aug | Sep | Oct | Nov | Dec |
|---|---|---|---|---|---|---|---|---|---|---|---|---|
| 1980 | | | | | .10k | | .05k | | .05k | | | |
| 1989 | | | | | | | .05k | | .05k | | | |
| 1990 | | | | | .09 | | .460 | | .070 | | | |
| | | | | | | | .060 | | .05k | | | |
| 1991 | | | | | .09 | | | | | | | |
| 1992 | * | | | | | .165 | | | | | | |

TOTAL IRON, HYPOLIMNION (mg/l)

| | Jan | Feb | Mar | Apr | May | Jun | Jul | Aug | Sep | Oct | Nov | Dec |
|---|---|---|---|---|---|---|---|---|---|---|---|---|
| 1988 | | | | | .200 | | .300 | | .400 | | | |
| 1989 | | | | | | | .400 | | .450 | | | |
| 1990 | | | | | .420 | | .470 | | .640 | | | |
| 1991 | | | | | .480 | | | | | | | |
| 1992 | * | | | | | 2.294 | | | | | | |

*Treatment Date

Figure 4:
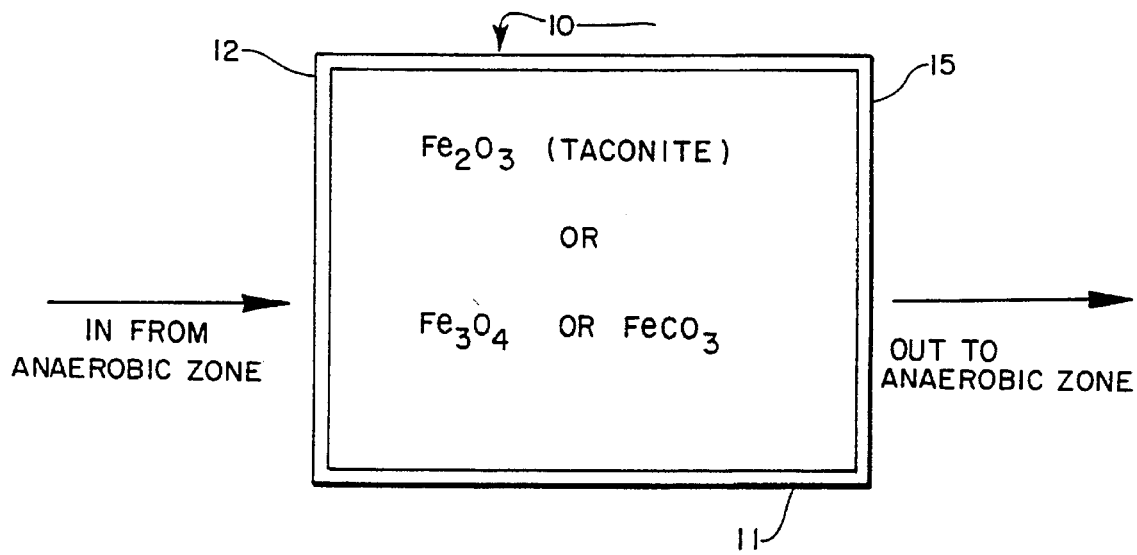
FIGS. 4 and 5 are schematic recirculating embodiments of the invention.

Another technique which may be used in accordance with this invention utilizes a recirculating approach with respect to the additive. Reference should be made to FIG. 4 which schematically shows a flow-through container-like device, generally designated 10 and which is constructed and arranged of any suitable housing 11 much like a flow-through filter or the like. Housing 11 contains an amount of $Fe_2O_3$, $Fe_3O_4$, $FeCO_3$ or any mixtures thereof which may be dispersed in a media such as fine gravel or the like to encourage flow of water through the device and exposure of the water to the iron contained therein. The requisite microbe is inoculated as required into the media. Where connected at its input end 12 to anaerobic water pumped from the bottom of a water system, which water flows through the device and is returned to the systems bottom by a conduit connected to its outlet end 13, the method of the invention will operate to treat the water and sediment of the system.

Figure 5:
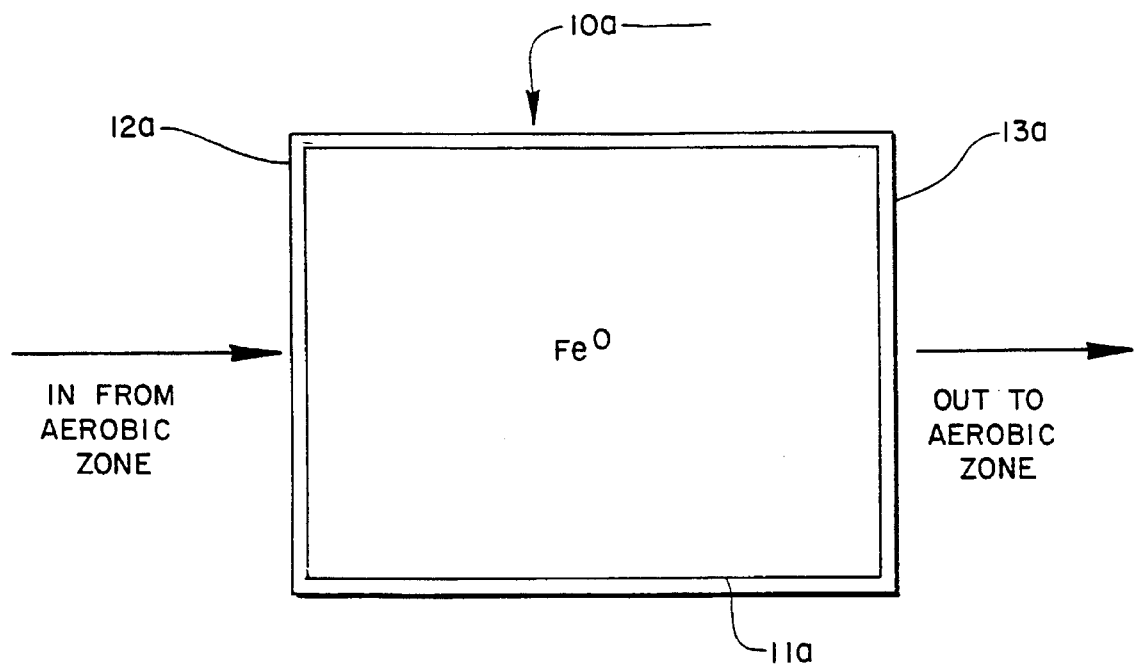

Likewise, referring to FIG. 5, a similar device as generally designated at 10a but which contains elemental iron ($Fe^0$) will also operate according to the invention.

Figure 6:
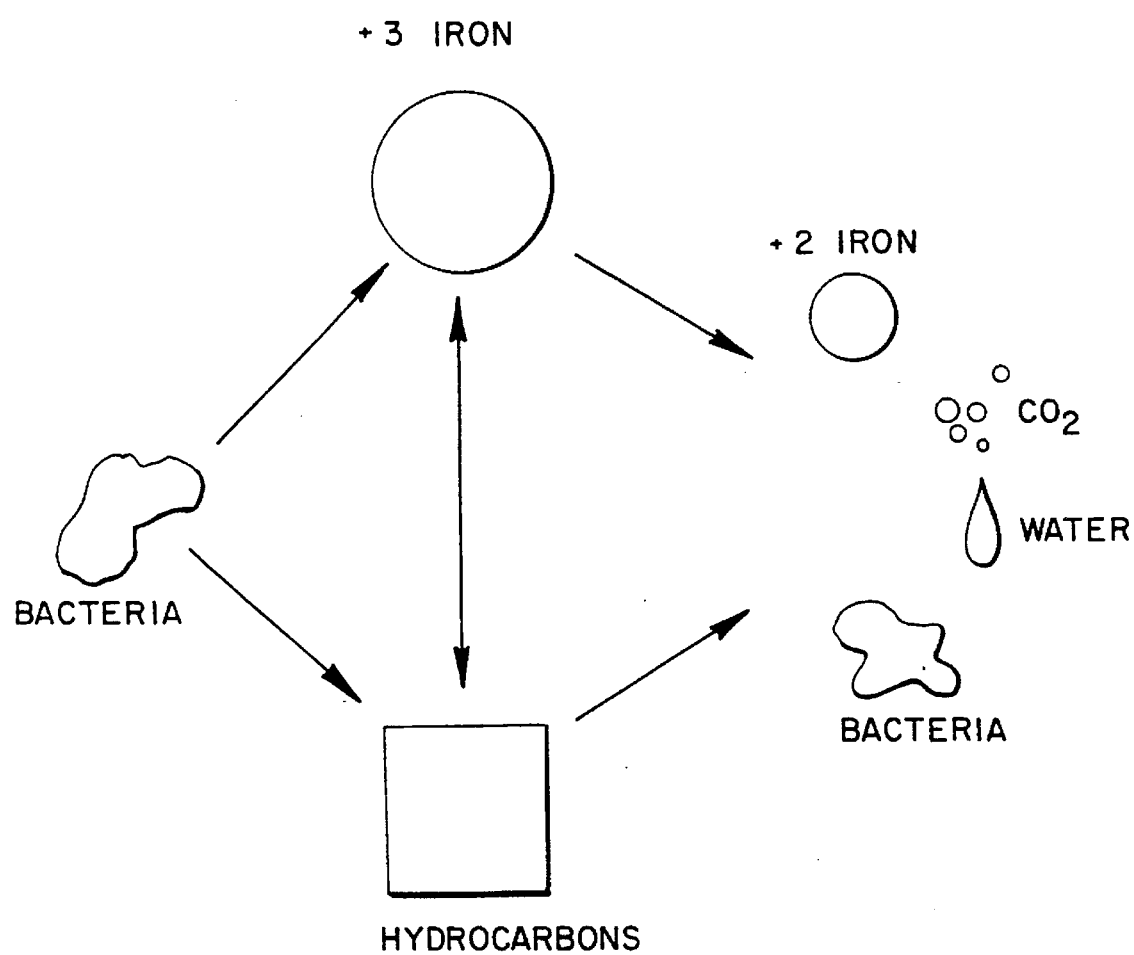
FIG. 6 is a schematic, showing anaerobic degradation of hydrocarbons utilizing bacteria and $Fe^{+3}$ as an electronic acceptor.

As already indicated, in another aspect of the invention, the methods described above reduce hydrocarbons and other organics, including benzene compounds and pesticides, in the sediment of the aqueous systems described above in direct proportion to the dose rate of the added iron used as a source of $Fe^{+3}$ e.g., magnetite, hematite or taconite, as above described earlier. As shown schematically in FIG. 6 the interaction of the bacteria, hydrocarbons and $Fe^{+3}$ yield $Fe^{+2}$, $CO_2$ and water.

As can be seen in Table 4 below, a bench test was completed on sediment samples from Peavey Lake which had been subjected to treatment according to the invention. As can be seen from the data in Table 4, not only was total phosphorous (TP) decreased (Table 4 Part A) but as a result of the same treatment, organic solids including hydrocarbons were decreased along with the sediment thickness. The reduction in the content of volatile solids (ashed at 550 degrees C) shows that the hydrocarbon content of the oxidized sediment had been reduced.

TABLE 4

Peavey-Sediment Bench Test
Water-Part A

| Magnitite Iron Added (gm) | TP (Total Phosphate) μgm/liter of water (measured in water above sediment) |
|---|---|
| Control (0) | .084 |
| 0.130 | .076 |
| 0.500 | .067 |
| 0.830 | .041 |
| 1.385 | .033 |
| 3.800 | .026 |
| 6.400 | .020 |
| 11.750 | .018 |

TABLE 4

Part B
Oxidized Layer (Sediment)

| Magnetite Iron Added (gm) | Sediment/Water Mix (Mg/L) | Oxidized Layer Total Solids, Sediment, Sand, Organics, etc. (no water) gm/L | Volatile Solids gm/L | Oxide Layer Thickness mm in Container |
|---|---|---|---|---|
| Control | 127 | 86.67 | 25.58 | 4 |
| .130 | 156 | 80.52 | 24.26 | 5 |
| 0.500 | 180 | 67.50 | 17.67 | 7 |
| 0.830 | 177 | 59.29 | 14.97 | 11 |
| 1.385 | 195 | 65.90 | 14.61 | 7 |
| 3.800 | 169 | 57.05 | 10.99 | 14 |
| 6.400 | 193 | 57.53 | 5.85 | 16 |
| 11/750 | 204 | 58.17 | 2.70 | 14 |

The samples in Table 4 were dried at 105° C. to provide "total solids" which were then treated at 550° C. to drive off any remaining volatiles to provide "volatile solids". The determination of remaining volatile solids as compared to the control samples is used to show the enhanced reduction in the oxidized sediments. As can be seen moving down the various columns of the table, with increasing iron dosage, the samples exhibit decreased hydrocarbon content (volatile solids column) and decreasing sediment thickness (oxide layer column). Although there will also be a loss of the carbon dioxide from the sediment carbonates, these constitute a small portion of the carbon content in lake sediments. The remainder is then classed as volatile hydrocarbons when ashed at 550 degrees C.

Hydrocarbons and like organics present in the soil as might be caused by a spill or the like, diffuse through the soil particles by means of the water which is everpresent in more or less amounts. In greater amounts, the water moves in plumes known as ground water. In such a situation it will carry the hydrocarbons or the like with it. In lesser amounts of water, the hydrocarbons or the like diffuse through the soil.

To test the effectiveness of the present invention on such contaminated water, the following bench test was carried out.

One gallon jars containing water from a ground water source with a documented history of contamination (1300 mg/L hydrocarbons and a background iron content of 1.6 mg/L: hydrocarbons consisting of 96% benzene and 4% aliphatics) were set up. Each jar was connected by tubing to an external 125 ml Erlynmeyer flask containing 100 ml 0.0112 moles alkaline potassium permanganate as a methane and carbon dioxide trap. The jars were treated as follows in Table 5.

TABLE 5

| Jar | Treatment |
|---|---|
| 1 | Control - no treatment |
| 5 | Inoculated with native soil bacteria from original site plus 5 mg/L $NO_3$ and B vitamins* |
| 6 | Inoculated with ATCC 55339 with reliance or background iron content |
| 8 | Inoculated with ATCC 55339 + 10 mg/L $Fe_2O_3$ and 5 mg/L $No_3$ and B Vitamin |

TABLE 5-continued

| Jar | Treatment |
|---|---|

*Added nitrates and vitamin B acceptable for ground water treatment to enhance microbial action but would not be used in lake, pond and the like treatment because in lake and pond sediments there are already sufficient amounts of vitamins and nitrogen compounds to support the microbial growth since these sediments consist of partially decayed plant and animal materials. In groundwater this is generally not the case and they may need to be added to generate microbial growth.

The results of the above treatments are as follows in Table 6.

TABLE 6

| Jar | Methane (mg/L) | $CO_2$ (mg/L) |
|-----|----------------|---------------|
| 1   | 0.53           | 11.2          |
| 5   | 5.87           | —             |
| 6   | 11.20          | 161.0         |
| 8   | 11.20          | 137.5         |

As can be seen, the degradation of the hydrocarbons into methane and carbon dioxides is greatly enhanced by the method of the invention.

In a practical real world treatment of contaminated soil, such as gasoline having leaked from underground tanks, $Fe^{+3}$ would be installed in the presence of the requisite microbes (naturally present or by inoculations as required) and the hydrocarbons and any available ground water. The microbes use the hydrocarbons as a source of carbon and the iron as an electron acceptor to product $Fe^{+2}$, carbon dioxide, small amounts of methane and water. If air is added, the $Fe^{+2}$ on contact become $Fe^{+3}$ and is again available as an electron acceptor.

This method may be carried out by drilling a series of spaced holes throughout the contaminated area and at its leading edge. The holes will preferably be as deep as the contamination. Each hole is filled with $Fe^{+3}$ iron (magnetite for example). The diameter of the holes and their spacing is determined by the volume of contamination, quality of the carbon source and the time requirement for treatment. These will be determined experimentally. As described above with respect to other aspects of the invention, the requisite microbes are either present or inoculated as required. Air supply tubes may be provided optionally for regenerating $Fe^{+3}$. Vent tubes will be provided for outgassing of $CO_2$ and methane.

The iron filled holes should be capped with concrete, for example, to prevent surface water introduction to the contaminated system. Preferably, the iron used will be relatively coarse, such as 10 mesh to 4 mesh for example, to allow contaminated ground water to flow through the reaction region with less restriction than the adjacent soils. The system should be set up with an excess $F3^{+3}$ oxide since the depletion of the groundwater hydrocarbons will automatically starve the microbes.

The method of the invention can be used for prevention as well as for clean-up by estimating accumulation and treating with amounts of iron source material i.e.. a source of $Fe^{+2}$ and $Fe^{+3}$, determined by the estimates. It can also be used for spot treatment as to prevent or control the present of Eurasian milfoil in selected areas of a body of water.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. An anaerobic microbial mediated method of treating aqueous/sedimentary systems, the method being based on a) the presence of microbes having the identifying characteristics of ATCC 55339 and including the ability to oxidize $Fe^0$ to $Fe^{+2}$, and reduce $Fe^{+3}$ to $Fe^{+2}$ and oxidize $S^{-2}$ to $S^0$, and b) the presence of amounts of $Fe^0$, $Fe_2O_3$, $Fe_3O_4$, or $FeCO_3$ as iron source material, comprising the steps:

a) determining the amounts of phosphorus, sulfur, and heavy metals and total hydrocarbon content to be treated in the system;
   b) determining the presence or absence of the aforementioned microbes and inoculating the sediment of the system to be treated from a known source if the requisite microbes are not present, and
   c) adding an iron source material which provides $Fe^{+2}$ and $Fe^{+3}$ to the system, the amount of iron source material being based on the first step above.

2. The method of claim 1 in which the presence of the requisite microbes is determined by testing a sample of the system to be treated with $Fe^{+3}$ and $Fe^0$ additions, the lack of anaerobic reduction of $Fe^{+3}$ to $Fe^{+2}$ or anaerobic oxidation of $Fe^0$ to $Fe^{+2}$ being taken as indicative of the absence of the microbes whereas a positive reaction is taken as the presence thereof.

3. A microbial mediated method of treating aqueous/sedimentary systems having an anaerobic zone therein, including anaerobic microenvironments the method being based on: a) the presence of microbes having the identifying characteristics of ATCC 55339 and including the ability to reduce $Fe^{+3}$ to $Fe^{+2}$, and oxidize $Fe^0$ to $Fe^{+2}$ and microbes which oxidize $S^{-2}$ to $S^0$ and b) the presence of amounts of $Fe^{+2}$ in the system, the source of the $Fe^{+2}$ being selected from the group consisting of $Fe^0$, $Fe_2O_3$, $Fe_3O_4$, $FeCO_3$ and mixtures thereof as source material, the method comprising the steps:

a) determining the levels of the amount of phosphorus and sulfur in the system;
   b) determining the presence or absence of the aforementioned microbes and inoculating the sediment of the system to be treated from a known source if the requisite microbes are not present, and
   c) adding amounts of $Fe^{+3}$ source material to the system, the amount being determined by the first step above, whereby elemental iron is anaerobically oxidized and precipitated as a sulfide salt.

4. The method of claim 3 wherein the selected source is $Fe_2O_3$.

5. The method of claim 4 wherein the $Fe_2O_3$ is taconite.

6. The method of claim 5 wherein the taconite is in the form of chips.

7. The method of claim 3 wherein the system is a pond or lake having an aerobic area and the treatment includes the addition of an amount of $Fe^0$ in that area.

8. The application of the method of claim 3 to natural ponds or lakes and to waste treatment facilities including waste water and sediments from food processing plants, sewage treatment facilities, septic tanks, reservoirs or other man made impoundments rivers and streams.

9. A method of treating a body of water wherein the presence of requisite microbes having the identifying characteristics of ATCC 55339 is assured by burying elemental iron in the ground surrounding the water along at least a portion of the perimeter of the body of water to be treated to thereby intercept drainage water headed toward the body of water.

10. The method of claim 9 wherein the requisite microbes are included with the iron if not already present.

11. A microbial mediated method of treating aqueous/sedimentary systems consisting of the addition of iron selected from the group consisting of $Fe^0$, $Fe_2O_3$, $Fe_3O_4$, $FeCO_3$ and mixtures thereof in the presence of requisite microbes having the identifying characteristics of ATCC55339 including the ability to oxidize $Fe^0$ to $Fe^{+2}$, reduce $Fe^{+3}$ to $Fe^{+2}$ and oxidize $S^{-2}$ to $S^0$.

12. The method of claim 11 wherein the requisite microbes are inoculated into the system if not already present.

13. A microbial mediated method of treating aqueous/sedimentary systems, the method being based on the additions of amounts of additive selected from the group consisting of $Fe^0$, $Fe_2O_3$, $Fe_3O_4$, $FeCO_3$ and mixtures thereof and the resulting activation of the systems in the presence of microbes having the identifying characteristics of ATCC 55339, the microbes having the ability to oxidize $S^{-2}$ to $S^0$ and to reduce $Fe^{+3}$ to $Fe^0$.

14. A microbial mediated method of decreasing the amount of hydrocarbons and other organics in the sediment of aqueous/sedimentary systems, the method being based on: a) the presence of microbes having the identifying characteristics of ATCC 55339 and which oxidize $Fe^0$ to $Fe^{+2}$, and reduce $Fe^{+3}$ to $Fe^{+2}$ and oxidize $S^{-2}$ to $S^0$, and b) the presence of amounts of $Fe^0$, $Fe_2O_3$, $Fe_3O_4$, $FeCO_3$, comprising the steps:

a) identifying a system containing hydrocarbons and other organics in the sediment;

b) determining the presence or absence of the aforementioned microbes and inoculating the sediment of the system to be treated from a known source if the requisite microbes are not present, and c) adding $Fe^{+3}$ to the system.

15. The method of claim 14 in which the presence of the requisite microbes is determined by testing with $Fe^{+3}$ and $Fe^0$ additions, a sample of the system to be treated, the lack of reaction, reduction of $Fe^{+3}$ to $Fe^{+2}$ or anaerobic oxidation of $Fe^0$ to $Fe^{+2}$ being taken as indicative of the absence of the microbes whereas a positive reaction is taken as the presence thereof.

16. A microbial mediated method of decreasing the amount of hydrocarbons and other organics in the sediment of aqueous/sedimentary systems having an anaerobic zone therein, the method being based on: a) the presence of microbes having the identifying characteristics of ATCC 55339 and which reduce $Fe^{+3}$, and which oxidize $S^{-2}$ to $S^0$ and b) the presence of amounts of $Fe^{+2}$ in the system, the source of the $Fe^{+2}$ being selected from the group consisting of $Fe_2O_3$, $Fe_3O_4$, $FeCO_3$ and mixtures thereof, comprising the steps:

a) determining the levels of the amount of hydrocarbons and other organics in the sediment;

b) determining the presence or absence of the aforementioned microbes and inoculating the sediment of the system to be treated from a known source if the requisite microbes are not present, and c) adding $Fe^{+3}$ to the system, the amount being determined by the first step above.

17. The method of claim 16 wherein the selected source is $Fe_2O_3$.

18. The method of claim 16 wherein the $Fe_2O_3$ is taconite.

19. The method of claim 18 wherein the taconite is in the form of chips.

20. The method of claim 16 wherein the system is a pond or lake having an aerobic area at the shoreline and the treatment includes the addition of 1.2×molar equivalent amount of $Fe^0$ in that area, the molar equivalent refers to treating the sediments with a sufficient quantity of ferric iron ($Fe^{+3}$), ferrous iron ($Fe^{+2}$), or elemental iron ($Fe^0$) to produce a finished molar equivalent of ferrous iron in anaerobic sediments or seasonally anaerobic sediments to precipitate the sulfide ($S^2$) and phosphorus as phosphate ($PO_4^{-3}$) as determined in the following manner; the sum of the phosphorous add sulfide ions contained in the top twenty centimeters of hydrofoil sediment, plus the anticipated influx of new phosphorus and sulfur from groundwater, plus the surface runoff component from the watershed over the next five years, plus that contained in the direct precipitation over the next five years, the 1.2 multiplier is to accommodate the common ion effect which forces the additional precipitation beyond the solubility product constant of anions, specifically phosphorus and sulfur.

21. The application of the method of claim 16 to natural ponds or lakes and to waste treatment facilities including waste water facilities and sediment collection facilities from food processing plants, sewage treatment facilities, septic tanks, reservoirs or other man made impoundments rivers and streams.

22. A method of treating a body of water wherein the presence of requisite microbes having the identifying characteristics of ATCC 55339 is assured and $Fe^{+3}$ oxide and/or elemental iron is buried in the ground along at least a portion of the perimeter of the body of water to be treated to thereby intercept hydrocarbons and other organics, phosphates, and sulfides in drainage water headed toward the body of water.

23. The method of claim 22 wherein the requisite microbes are included with the iron if not already present.

24. A microbial mediated method of decreasing the amount of hydrocarbons and other organics in the sediment of aqueous/sedimentary systems consisting of the addition of iron selected from the group consisting of $Fe^0$, $Fe_2O_3$, $Fe_3O_4$, $FeCO_3$ and mixtures thereof in the presence of requisite microbes and having the identifying characteristics of ATCC 5539 and being capable of oxidizing $Fe^0$ to $Fe^{+2}$, reducing $Fe^{+3}$ to $Fe^{+2}$, and oxidizing $S^{-2}$ to $S^0$.

25. The method of claim 24 wherein the requisite microbes are inoculated into the system if not already present.

26. A microbial mediated method of decreasing the amount of hydrocarbons and other organics in the sediment of aqueous/sedimentary systems, the method being based on the additions of amounts of additive selected from the group consisting of $Fe^0$, $Fe_2O_3$, $Fe_3O_4$, $FeCO_3$ and mixtures thereof and the resulting activation of the systems in the presence of microbes having the identifying characteristics of ATCC 55339, the microbes having the ability to oxidize $Fe^{+2}$ to $Fe^{+3}$ and $S^{-2}$ to $S^0$ and to reduce $Fe^{+3}$ to $Fe^{+2}$.

27. A microbial mediated method of decreasing the amount of hydrocarbons and other organics in soil, the method being based on: a) the presence of microbes having the identifying characteristics of ATCC 55339 and being capable of reducing $Fe^{+3}$ to $Fe^{+2}$ and the presence of amounts of iron as $Fe_2O_3$ or $Fe_3O_4$, comprising the steps:

a) determining the levels of the amount of hydrocarbons and other organics in the soil to be treated, b) determining the presence or absence of the aforementioned microbes and inoculating the soil to be treated from a known source if the requisite microbes are not present, c) and adding $Fe^{+3}$ to the soil in an excess amount relative to the hydrocarbon and other organic amounts to be treated, as determined by step a) above.

28. The method of claim 27 including the additional step of forming a plurality of holes in the soil for depositing $Fe^{+3}$ therein.

29. The method of claim 28 wherein means for venting the holes are included.

30. The method of claim 27 wherein the holes are at least as deep as the hydrocarbon contamination and other organics in the soil.

31. The method of claim 27 wherein the holes are capped after being filled with the $Fe^{+3}$.

32. A method for treating soil comprising the steps:

forming holes in the soil, placing a quantity of $Fe_2O_3$ and/or $Fe_3O_4$ and a quantity of microbes in each hole, capping the holes to prevent surface contamination and venting the holes, the microbes having the identifying characteristics of ATCC 55339.

33. A microbial mediated method of limiting the activation of the accumulated sulfur, phosphorus, heavy metals and/or organics including benzene, toluene, kerosene and other petrochemicals, and preventing the establishment, of Eurasian milfoil and algae in aqueous/sedimentary systems by means of microbes having the identifying characteristics of ATCC 55339 and which oxidize $Fe^0$ to $Fe^{+2}$ and reduce $Fe^{+3}$ to $Fe^{+2}$ and oxidize $S^{-2}$ to $S^0$, comprising the steps of:

estimating the levels of the amount of such forgoing accumulations;

determining the presence or absence of the aforementioned microbes and inoculating the system with them if they are not present; and adding amounts of iron source material to the system based on the foregoing estimate to substantially reduce the amounts of the foregoing accumulations.

34. The method of treating an aqueous/sedimentary system comprising the steps of adding iron source material to the system in the presence of microbes having the identifying characteristics of ATCC and which oxidize $Fe^0$ to $Fe^{+2}$ and reduce $Fe^{+3}$ to $Fe^{+2}$ and oxidize $S^{-2}$ to $S^0$, the iron source material being such that it acts as a source of $Fe^{+2}$ and $Fe^{+3}$.

35. The method of claim 34 wherein the microbes are added if not naturally present.

36. The method of spot treating aqueous/sedimentary systems for the prevention and control of Eurasian milfoil growth, comprising the step of adding iron source material to the system in the presence of microbes having the identifying characteristics of ATCC 55339 and which oxidize $Fe^0$ to $Fe^{+2}$ and reduce $Fe^{+3}$ to $Fe^{+2}$ and oxidize $S^{-2}$ to $S^0$, the iron source material being such that it acts as a source of $Fe^{+2}$ and $Fe^{+3}$.

37. The method of claim 36 wherein the microbes are added if not naturally present.

38. The method of treating an aqueous/sedimentary system to suppress heavy metal activity therein comprising the step of adding iron source material to the system in the presence of microbes having the identifying characteristics of ATCC 55339 and which oxidize $Fe^0$ to $Fe^{+2}$ and reduce $Fe^{+3}$ to $Fe^{+2}$ and oxidize $S^{-2}$ to $S^0$, the iron source material acting to provide $Fe^{+2}$ and $Fe^{+3}$ to the system.

* * * * *

UNITED STATES PATENT AND TRADEMARK OFFICE
CERTIFICATE OF CORRECTION

PATENT NO. : 5,620,893

DATED : April 15, 1997

INVENTOR(S) : Delman R. Hogan and James R. Robin

It is certified that error appears in the above-identified patent and that said Letters Patent is hereby corrected as shown below:

Column 8, line 49, "Component + Number" should read "Component X Number"

Column 8, line 65, "(32.06g/m S)" should read "(32.06 g/m P)"

Column 12, line 6, "$Fe^{-2}$" should read "$Fe^{+2}$"

Column 12, line 11, "take" should read "lake"

Column 15, line 48, "pans should read "parts"

Column 16, line 19, "opperation sediments" should read "operation of the microbes in the sediments"

Column 29, line 2, "ATCC55339" should read "ATC C55339"

Column 30, line 2, "$S^{2}$" should read "$S^{-2}$"

Column 30, line 3, "manner; the" should read "manner: the"

Column 30, line 3-4, "phosphorus add sulfide" should read "phosphorus and sulfide"

Column 30, line 5, "hydrofoil" should read "hydrosoil"

UNITED STATES PATENT AND TRADEMARK OFFICE
CERTIFICATE OF CORRECTION

PATENT NO. : 5,620,893

DATED : April 15, 1997

INVENTOR(S) : Delman R. Hogan and James R. Robin

It is certified that error appears in the above-identified patent and that said Letters Patent is hereby corrected as shown below:

Column 8, line 55, " $\left(\dfrac{TS\ mg/L}{32{,}06\ g/m\ S}\right)$ " should read " $\left(\dfrac{TS\ mg/L}{32.06\ g/m\ S}\right)$ "

Column 13, line 47, "hypolymmon" should read "hypolimnion"

Column 25, line 55, "11/750" should read "11,750"

Column 30, line 33, "ATCC 5539" should read "ATCC 55339"

Signed and Sealed this

Eleventh Day of May, 1999

Q. TODD DICKINSON

*Attest:*

*Attesting Officer*  Acting Commissioner of Patents and Trademarks

UNITED STATES PATENT AND TRADEMARK OFFICE
CERTIFICATE OF CORRECTION

PATENT NO. : 5,620,893
DATED : April 15, 1997
INVENTOR(S) : Delman R. Hogan, et al.

It is certified that error appears in the above-identified patent and that said Letters Patent is hereby corrected as shown below:

On the title page item [56], under the heading U.S. Patent Documents "4,209,575" should read --4,029,575--.

Column 4, line 18, "anerobic" should read --anaerobic--.

Column 27, line 44, "F3$^{+3}$" should read --Fe$^{+3}$--.

Signed and Sealed this

Fourth Day of January, 2000

Attest:

Attesting Officer

Acting Commissioner of Patents and Trademarks

UNITED STATES PATENT AND TRADEMARK OFFICE
CERTIFICATE OF CORRECTION

PATENT NO.    : 5,620,893
DATED         : April 15, 1997
INVENTOR(S)   : Delman R. Hogan, James R. Robin It is certified that error appears in the above-identified patent and that said Letters Patent is hereby corrected as shown below:

Column 29, line 14, "$Fe^0$" should read -- $Fe^{+2}$ --.

Signed and Sealed this

Fifth Day of December, 2000

Attest:

Q. TODD DICKINSON

Attesting Officer

Director of Patents and Trademarks